US009844731B2

(12) United States Patent
Tamaoki et al.

(10) Patent No.: US 9,844,731 B2
(45) Date of Patent: Dec. 19, 2017

(54) GAME SYSTEM, SERVER SYSTEM, PROCESSING METHOD, AND INFORMATION STORAGE MEDIUM

(71) Applicant: BANDAI NAMCO ENTERTAINMENT INC., Tokyo (JP)

(72) Inventors: Jun Tamaoki, Tokyo (JP); Makoto Yonezawa, Yokohama (JP); Ryota Mihashi, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 277 days.

(21) Appl. No.: 14/484,923

(22) Filed: Sep. 12, 2014

(65) Prior Publication Data

US 2015/0080083 A1  Mar. 19, 2015

(30) Foreign Application Priority Data

Sep. 18, 2013  (JP) ................... 2013-193590

(51) Int. Cl.
*A63F 13/85* (2014.01)
*A63F 13/35* (2014.01)
*G07F 17/32* (2006.01)

(52) U.S. Cl.
CPC .............. *A63F 13/85* (2014.09); *A63F 13/35* (2014.09); *G07F 17/326* (2013.01); *G07F 17/3225* (2013.01); *G07F 17/329* (2013.01)

(58) Field of Classification Search
CPC .. G07F 17/3225; G07F 17/326; G07F 17/329; A63F 13/85; A63F 13/35
See application file for complete search history.

(56) References Cited

U.S. PATENT DOCUMENTS

2013/0196732 A1   8/2013  Oochi et al.

FOREIGN PATENT DOCUMENTS

| JP | A-09-10433 | 1/1997 |
| JP | A-2000-5439 | 1/2000 |
| JP | 2013-156743 A | 8/2013 |

OTHER PUBLICATIONS

Sid Meier's Civilization V, 2010, Firaxis Games.*
Sid Meier's Civilization V Walktrhough Strategy Guide—Technology, Nov. 25, 2012, MyCheats.*

(Continued)

*Primary Examiner* — Werner Garner
(74) *Attorney, Agent, or Firm* — Oliff PLC

(57) ABSTRACT

A game system includes a game processing section that performs a game process, a lottery processing section that sets a lottery range that specifies a range of items among a plurality of items used during the game process that are subjected to a lottery process, and selects an item from the items that belong to the lottery range by performing the lottery process, and an item acquisition processing section that performs a process that allows a player to acquire the selected item. Information about the plurality of items has a data structure in which the plurality of items are linked to have a parent-child relationship. The lottery processing section sets the lottery range so that a child item is included within the lottery range when a parent item has been set to an acquired state or an acquirable state, and changes the set lottery range based on given information.

17 Claims, 21 Drawing Sheets

(56) References Cited

OTHER PUBLICATIONS vexing, Research Agreements, Nov. 6, 2011, Civilization Fanatics Center.*
Espionage, Jul. 3, 2013, Civilization Wiki, accessed on Aug. 24, 2016, available at <<http://web.archive.org/web/20130703060928/http://civilization.wikia.com/wiki/Espionage_(Civ5)>>.*
What are the chances of a spy stealing your cities' information?, Aug. 20, 2013, Arqade.*
"What is Package Gacha?" Retrieved from the Internet: <<http://doliland2game-gree.com/information/package-gacha/>>.
"Onmyoji-Heianyouemaki—Package on an element bases" Retrieved from the Internet: <<http://wikiwiki.jp/heian/?%C2%B0%C0%AD%CA%CC%A5%D1%A5%C3%A5%B1%A1%BC%A5%B8>>.

* cited by examiner

LOTTERY COUNT AND DURATION FOR
WHICH LOTTERY COUNT REMAINS CHANGED

CHANGED BASED ON INPUT INFORMATION,
STATUS INFORMATION,
GAME STATUS INFORMATION,
OR CHARGE INFORMATION ABOUT PLAYER

LOTTERY RANGE AND LOTTERY COUNT

CHANGED BASED ON INFORMATION
ABOUT TEAM OR INFORMATION ABOUT
ANOTHER PLAYER WHO BELONGS TO TEAM

FIG. 11

PLAYER PLAYS GAME TO INCREASE RESEARCH GAUGE OF AIRFRAME

PLAYER PROCEEDS WITH GAME, AND UNLOCKS NEW RESEARCH CLASS TO CREATE OPPORTUNITY FOR ACQUIRING DESIRED AIRFRAME

PLAYER SENDS RESEARCH REQUEST TO PLANT IN EXCHANGE FOR COLLECTED TOKENS, AND INCREASES PROBABILITY THAT DESIRED AIRFRAME IS ACQUIRED

PLAYER BUILDS ADDITIONAL PLANT (OR EXTENDS EXISTING PLANT) IN EXCHANGE THE PAYMENT OF MONEY SO THAT RESEARCH PROCEEDS PROMPTLY, AND PLAYER CAN PROMPTLY ACQUIRE DESIRED AIRFRAME

FIG. 18

| LEAVE | RESEARCH IS SELECTED BY LOTTERY FROM ALL OF RESEARCHES (ITEMS) THAT CAN BE DEVELOPED ON TREE | 0 TOKENS |
|---|---|---|
| REQUEST RESEARCH OF ARBITRARY CLASS | SELECT RESEARCH CLASS, AND CONDUCT RESEARCH OF ONLY SELECTED RESEARCH CLASS | TN1 TOKENS@M HOURS |
| REQUEST LEVEL INCREASE RESEARCH (IMPROVEMENT RESEARCH) | LIMITED TO LEVEL INCREASE RESEARCH | TN2 (>TN1) TOKENS@M HOURS |
| REQUEST NEW RESEARCH | LIMITED TO NEW RESEARCH | TN3 (>TN2) TOKENS@M HOURS |

FIG. 20

| LEVEL | DETERMINATION THRESHOLD VALUE | TOKEN | RARITY (PROBABILITY) | LOTTERY | | | | | |
|---|---|---|---|---|---|---|---|---|---|
| | | | | NORMAL | | RARE | | SPECIAL RARE | |
| | | | | RARITY | CHANGE VALUE | RARITY | CHANGE VALUE | RARITY | CHANGE VALUE |
| 1 | 150 | 5000 | 10 | 70 | 10 | 25 | 20 | 5 | 60 |
| 2 | 180 | 5200 | 9 | 70 | 10 | 25 | 20 | 5 | 60 |
| 3 | 250 | 5500 | 7 | 70 | 10 | 25 | 20 | 5 | 60 |
| …… | …… | …… | …… | …… | …… | …… | …… | …… | …… |

GAME SYSTEM, SERVER SYSTEM, PROCESSING METHOD, AND INFORMATION STORAGE MEDIUM

Japanese Patent Application No. 2013-193590 filed on Sep. 18, 2013, is hereby incorporated by reference in its entirety.

BACKGROUND

The present invention relates to a game system, a server system, a processing method, an information storage medium, and the like.

A game system has been known that allows the player to acquire an item (e.g., machine, weapon, equipment, dress, or accessory) as a result of game play, and acquire a higher-level item by continuing to play the game.

Such a game system may be configured so that item information is stored to have a tree data structure, and the player can acquire the child-node item by acquiring the parent-node item included in the tree structure to sequentially acquire the items included in the tree structure, for example.

Such a game system allows the player to efficiently acquire the desired high-level items. However, the game software manufacturer must always add new items in order to prevent a situation in which the player gets tired of the game.

If the game system is configured so that the player can acquire an item through a simple lottery process, the player may not feel that he has made efforts to acquire the desired item, and may lose his motivation to continue to play the game. Note that JP-A-9-10433 and JP-A-2000-5439 disclose a related-art technique in which game round information or hierarchical stage has a tree structure, for example.

SUMMARY

According to one aspect of the invention, there is provided a game system comprising:

a game processing section that performs a game process;

a lottery processing section that sets a lottery range that specifies a range of items among a plurality of items used during the game process that are subjected to a lottery process, and selects an item from the items that belong to the lottery range by performing the lottery process; and an item acquisition processing section that performs a process that allows a player to acquire the selected item, information about the plurality of items having a data structure in which the plurality of items are linked to have a parent-child relationship, and the lottery processing section setting the lottery range so that a child item is included within the lottery range when a parent item has been set to an acquired state or an acquirable state, and changing the set lottery range based on given information.

According to another aspect of the invention, there is provided a server system comprising:

a game processing section that performs a game process;

a lottery processing section that sets a lottery range that specifies a range of items among a plurality of items used during the game process that are subjected to a lottery process, and selects an item from the items that belong to the lottery range by performing the lottery process; and an item acquisition processing section that performs a process that allows a player to acquire the selected item, information about the plurality of items having a data structure in which the plurality of items are linked to have a parent-child relationship, and the lottery processing section setting the lottery range so that a child item is included within the lottery range when a parent item has been set to an acquired state or an acquirable state, and changing the set lottery range based on given information.

According to another aspect of the invention, there is provided a processing method comprising:

performing a game process;

setting a lottery range that specifies a range of items among a plurality of items used during the game process that are subjected to a lottery process, and performing the lottery process that selects an item from the items that belong to the lottery range; and performing an item acquisition process that allows a player to acquire the selected item, information about the plurality of items having a data structure in which the plurality of items are linked to have a parent-child relationship, and the performing of the lottery process including setting the lottery range so that a child item is included within the lottery range when a parent item has been set to an acquired state or an acquirable state, and changing the set lottery range based on given information.

According to another aspect of the invention, there is provided a computer-readable information storage medium storing a program that causes a computer to execute the processing method as defined above.

BRIEF DESCRIPTION OF THE DRAWINGS

FIG. 11 is a view illustrating an example in which a method according to one embodiment of the invention is applied to a game.

FIG. 18 is a view illustrating an example of a research order that can be commissioned to a plant by a player.

FIG. 20 illustrates an example of lottery table information.

DESCRIPTION OF EXEMPLARY EMBODIMENTS

Figure 1:
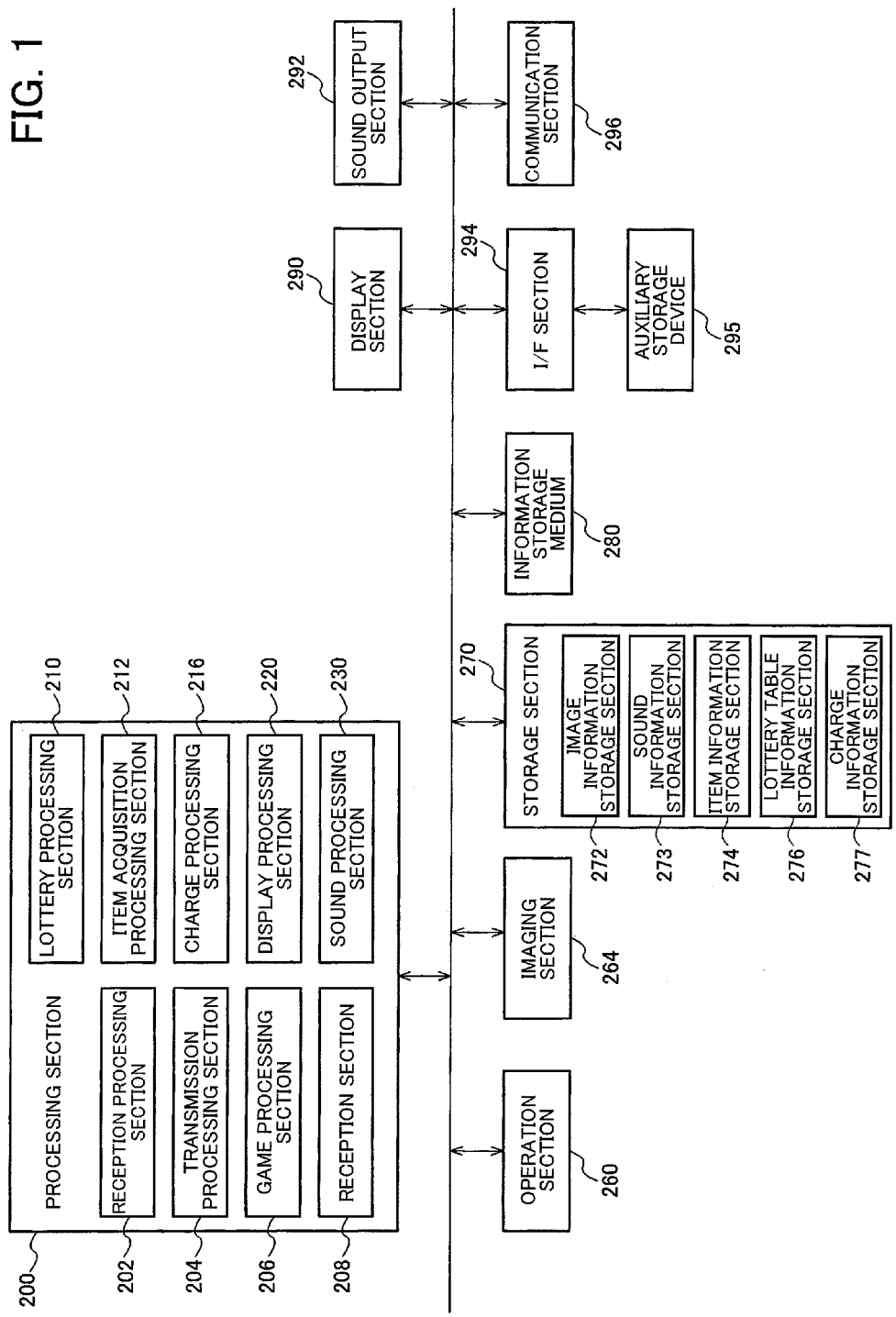
FIG. 1 illustrates a configuration example of a game system according to one embodiment of the invention.

Several aspects of the invention may provide a game system, a server system, a processing method, an information storage medium, and the like that allow the player to acquire an item by utilizing a novel lottery process.

According to one embodiment of the invention, there is provided a game system comprising:

a game processing section that performs a game process;

a lottery processing section that sets a lottery range that specifies a range of items among a plurality of items used during the game process that are subjected to a lottery process, and selects an item from the items that belong to the lottery range by performing the lottery process; and an item acquisition processing section that performs a process that allows a player to acquire the selected item, information about the plurality of items having a data structure in which the plurality of items are linked to have a parent-child relationship, and the lottery processing section setting the lottery range so that a child item is included within the lottery range when a parent item has been set to an acquired state or an acquirable state, and changing the set lottery range based on given information.

According to one embodiment of the invention, the lottery range is set to items among the plurality of items used during the game process, and an item is selected by the lottery process from the items that belong to the lottery range. The process that allows the player to acquire the selected item is then performed. The information about the plurality of items has a data structure in which the plurality of items are linked to have a parent-child relationship, and the lottery range is set so that a child item is included within the lottery range when a parent item has been set to the acquired state or the acquirable state. The lottery range set as described above is changed based on the given information. This configuration makes it possible to set the lottery range to the items for which the information is stored to have a parent-child data structure, and change the lottery range based on the given information. This makes it possible to combine the advantages achieved by the lottery method and the advantages achieved by the method that stores the item information to have a parent-child data structure, and implement a system that allows the player to acquire an item by utilizing a novel lottery process.

In the game system, the lottery processing section may change the lottery range of the lottery process based on at least one piece of information among input information input by the player, status information about the player, game status information about the player, and charge information about the player.

This configuration makes it possible to reflect the input information input by the player, the status information about the player, the game status information about the player, or the charge information about the player in the lottery range of the lottery process. This makes it possible to meet various player demands, and allow the player to enjoy a wide variety of strategic item acquisition processes, for example.

In the game system, the lottery processing section may change a lottery count of the lottery process based on at least one piece of information among the input information input by the player, the status information about the player, the game status information about the player, and the charge information about the player.

This makes it possible to reflect the input information input by the player, the status information about the player, the game status information about the player, or the charge information about the player in the lottery count, and implement a novel lottery process.

In the game system, the lottery processing section may change at least one of a duration for which the lottery range remains changed, and a duration for which the lottery count remains changed, based on at least one piece of information among the input information input by the player, the status information about the player, the game status information about the player, and the charge information about the player.

This makes it possible to also reflect the input information input by the player or the like in the duration for which the lottery range remains changed, or the duration for which the lottery count is changed.

In the game system, the lottery processing section may change at least one of the lottery range, the lottery count, the duration for which the lottery range remains changed, and the duration for which the lottery count remains changed, based on information about a team to which the player belongs, or information about another player who belongs to the team.

This makes it possible to implement a lottery process that reflects the information about the team to which the player belongs, or the information about another player who belongs to the team.

In the game system, the lottery processing section may change the lottery range so that the lottery range is set based on an item that has been set to the acquired state or the acquirable state.

This makes it possible to implement a lottery range change process that is suitable when the item information has a parent-child data structure.

In the game system, the plurality of items may be classified to belong to one class among first to Nth classes, and the lottery processing section may set items that belong to Lth to Kth ($1 \leq L \leq K \leq N$) classes among the first to Nth classes to be a lottery range setting target when a level of the player corresponds to the Kth class among the first to Nth classes.

This makes it possible to set the lottery range of the lottery process corresponding to the level of the player or the item class that corresponds to the level of the player.

In the game system, the lottery processing section may change the lottery range so that the lottery range is set to items that belong to a class selected from the Lth to Kth classes based on the given information.

This makes it possible to change the lottery range of the lottery process to a range corresponding to a low-level class, or change the lottery range of the lottery process to a range corresponding to a high-level class, for example.

In the game system, the lottery processing section may perform a level change process that changes a level of an item that has been set to the acquired state or the acquirable state and has been selected by the lottery process.

This makes it possible to implement the level change process that changes the level of an item in addition to the item acquisition process by utilizing the lottery process.

In the game system, the lottery processing section may change the lottery range so that the lottery range is set to an item that has been set to the acquired state or the acquirable state and is subjected to the level change process.

This makes it possible to limit the lottery range of the lottery process to the range of an item that is subjected to the level change process, and meet various player demands, for example.

In the game system, the lottery processing section may select an item from the lottery range by performing the lottery process on condition that the player has performed game play, or has finished game play, and the item acquisition processing section may change acquisition determination points of the item that has been selected from the lottery range, and allow the player to acquire an item for which the acquisition determination points have reached a given determination threshold value.

This makes it possible to change the acquisition determination points of an item that has been selected by the lottery process, and allow the player to acquire the item when the acquisition determination points have reached the determination threshold value.

In the game system, the lottery processing section may perform a lottery process that determines a change value of the acquisition determination points of the item that has been selected from the lottery range.

This makes it possible to select the change value of the acquisition determination points by utilizing the lottery process, and implement a wide variety of lottery processes, for example.

In the game system, the item acquisition processing section may set at least one of the change value of the acquisition determination points and the determination threshold value based on at least one piece of information among the input information input by the player, the status information about the player, the game status information about the player, and the charge information about the player.

This makes it possible to reflect the input information input by the player, the status information about the player, the game status information about the player, or the charge information about the player in the change value of the acquisition determination points or the determination threshold value. Therefore, it is possible to set the item acquisition process to be advantageous or disadvantageous to the player.

According to another embodiment of the invention, there is provided a server system comprising:

a game processing section that performs a game process;

a lottery processing section that sets a lottery range that specifies a range of items among a plurality of items used during the game process that are subjected to a lottery process, and selects an item from the items that belong to the lottery range by performing the lottery process; and an item acquisition processing section that performs a process that allows a player to acquire the selected item, information about the plurality of items having a data structure in which the plurality of items are linked to have a parent-child relationship, and the lottery processing section setting the lottery range so that a child item is included within the lottery range when a parent item has been set to an acquired state or an acquirable state, and changing the set lottery range based on given information.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Game System

FIG. 1 illustrates a configuration example of a game system according to one embodiment of the invention. The game system includes a processing section 200, an operation section 260, an imaging section 264, a storage section 270, a display section 290, a sound output section 292, an OF section 294, and a communication section 296. Note that the configuration of the game system according to one embodiment of the invention is not limited to the configuration illustrated in FIG. 1. Various modifications may be made, such as omitting some of the elements (sections), or adding other elements.

The processing section 200 (processor) performs a game process, an image display process, a sound process, and the like based on operation information from the operation section 260, a program, and the like. The processing section 200 performs various processes using the storage section 270 as a work area. The function of the processing section 200 may be implemented by hardware such as a processor (e.g., CPU or GPU) or an ASIC (e.g., gate array), or a program.

The processing section 200 includes a reception processing section 202, a transmission processing section 204, a game processing section 206, a reception section 208, a lottery processing section 210, an item acquisition processing section 212, a charge processing section 216, a display processing section 220, and a sound processing section 230.

The reception processing section 202 performs a reception process that receives information through a network, and the transmission processing section 204 performs a transmission process that transmits information through a network. For example, the reception processing section 202 performs the reception process that receives information from an external device (e.g., server system or another terminal device), and the transmission processing section 204 performs a transmission process that transmits information to an external device (e.g., server system or another terminal device). The reception process includes a process that instructs the communication section 296 to receive information, a process that acquires information received by the communication section 296, and writes the acquired information into the storage section 270, and the like. The transmission process includes a process that instructs the communication section 296 to transmit information, a process that indicates the transmission target information to the communication section 296, and the like. The display processing section 220 performs a process for displaying an image on the display section 290. For example, when the terminal device generates an image, the display processing section 220 performs a drawing process based on the results of various processes (game process) performed by the processing section 200 to generate an image, and outputs the generated image to the display section 290. When the server system generates an image, the display processing section 220 performs a process that displays an image based on image information from the server system on the display section 290. The sound processing section 230 performs a sound process based on the results of various processes performed by the processing section 200. The sound processing section 230 thus causes the sound output section 292 to output a background music (BGM), a game sound, voice, and the like. The image information displayed on the display section 290 and the sound information output from the sound output section 292 are stored in an image information storage section 272 and a sound information storage section 273 included in the storage section 270. The details of the game processing section 206, the reception section 208, the lottery processing section 210, the item acquisition processing section 212, and the charge processing section 216 are described later.

The operation section 260 allows the player (user) to input various types of information (e.g., operation information). The function of the operation section 260 may be implemented by an operation button, a direction key, an analog stick, a lever, a sensor (e.g., angular velocity sensor and acceleration sensor), a microphone, a touch panel display, and the like.

The imaging section 264 (camera) captures an object. The imaging section 264 may be implemented by an image sensor (e.g., CCD or CMOS sensor), an optical system (e.g., focus lens), and the like.

The storage section 270 serves as a work area for the processing section 200, the communication section 296, and the like. The function of the storage section 270 may be implemented by a RAM (DRAM or VRAM), a hard disk drive (HDD), a solid-state drive (SSD), or the like. A game program and game data necessary for executing the game program are stored in the storage section 270.

An information storage medium 280 (computer-readable medium) stores a program, data, and the like. The function of the information storage medium 280 may be implemented by an optical disk (CD or DVD), an HDD, a memory (e.g., ROM), or the like. The processing section 200 performs various processes according to one embodiment of the invention based on a program (data) stored in the information storage medium 280. Specifically, a program that causes a computer (i.e., a device that includes an operation section, a processing section, a storage section, and an output section) to function as each section according to one embodiment of the invention (i.e., a program that causes a computer to execute the process performed by each section) is stored in the information storage medium 280.

The display section 290 outputs (displays) an image generated according to one embodiment of the invention. The function of the display section 290 may be implemented by an LCD, an organic EL display, a CRT, an HMD, or the like. The sound output section 292 outputs sound generated according to one embodiment of the invention. The function of the sound output section 292 may be implemented by a speaker, a headphone, or the like.

The I/F (interface) section 294 performs an interface process that interfaces with an auxiliary storage device 295 (portable information storage medium). The function of the I/F section 294 may be implemented by an I/F processing ASIC or the like. The auxiliary storage device 295 (auxiliary memory or secondary memory) is a storage device used to supplement the capacity of the storage section 270. The auxiliary storage device 295 may be implemented by a memory card (SD memory card or multimedia card), a USB memory, or the like.

The communication section 296 communicates with an external device (e.g., server system or another terminal device) through a cable or wireless network. The function of the communication section 296 may be implemented by hardware (e.g., communication ASIC or communication processor) or communication firmware.

The game system according to one embodiment of the invention includes the game processing section 206, the reception section 208, the lottery processing section 210, the item acquisition processing section 212, and the charge processing section 216 for implementing the method according to one embodiment of the invention.

The game processing section 206 performs the game process. The game process includes starting the game when game start conditions have been satisfied, proceeding with the game, calculating the game results, and finishing the game when game finish conditions have been satisfied, for example.

The game processing section 206 performs a process that implements a game that utilizes a moving object that moves in a game space based on the operation information (operation information input by the player). The moving object is an object that imitates an airplane (fighter aircraft), a car, a tank, a robot, a ship, a human, or the like. For example, when implementing a three-dimensional game, the moving object (object) is disposed in an object space (i.e., game space), and the movement and the motion of the moving object are controlled based on the operation information input by the player, and a given algorithm executed by a computer.

More specifically, an object (i.e., an object formed by a primitive surface such as a polygon, a free-form surface, or a subdivision surface) that represents a display object such as a moving object (character), a map (topography), a building, a track (course) (road), a tree, or a wall is disposed in the object space. Specifically, the position and the rotation angle (synonymous with orientation or direction) of the object in a world coordinate system are determined, and the object is disposed at the determined position (X, Y, Z) and the determined rotation angle (rotation angles around X, Y, and Z axes). The moving object that moves (make a motion) in the object space is controlled. For example, the moving object is moved in the object space based on the operation information input by the player, a program (movement algorithm), various types of data, and the like. Specifically, a simulation process is performed that sequentially calculates movement information (position, rotation angle, speed, or acceleration) about the moving object every frame (e.g., 1/60th of a second). Note that the term "frame" refers to a time unit used when performing a movement process, a motion process, and an image generation process.

The reception section 208 performs a reception process that receives information input by the player. For example, the reception section 208 receives information input by the player via the operation section 260. Specifically, the reception section 208 receives instruction information input by the player as input information, and the game processing section 206, the lottery processing section 210, the item acquisition processing section 212, and the charge processing section 216 perform various processes based on the instruction information (input information).

The charge processing section 216 performs a charge process (e.g., charge determination process, charge data generation process, and storage process). A charge information storage section 277 included in the storage section 270 stores charge information used for the charge process performed by the charge processing section 216.

The lottery processing section 210 performs an item lottery process. Specifically, the lottery processing section 210 sets an item lottery range, and selects an item from the items that belong to the lottery range by performing a lottery process. The lottery range specifies the range of items (among a plurality of items used during the game process) that are subjected to the lottery process.

For example, an item information storage section 274 included in the storage section 270 stores information (e.g., item identification information) about a plurality of items used during the game process. The lottery processing section 210 sets the lottery range that specifies items among the plurality of items that are subjected to the lottery process. The lottery processing section 210 selects (samples) an item from the items that belong to the lottery range by performing the lottery process. The lottery process includes a random sampling process, for example. Specifically, the lottery process includes a process that generates random number information, and randomly samples an item based on the generated random number information. The lottery process is performed using lottery table information stored in a lottery table information storage section 276 included in the storage section 270. For example, the lottery table information has a structure in which sampling probability information (rarity) and the like are linked to each item among a plurality of items. The lottery processing section 210 performs the item lottery process based on the random number information and the lottery table information.

In one embodiment of the invention, the information about the plurality of items has a data structure in which the plurality of items are linked to have a parent-child relationship. The lottery processing section 210 sets the lottery range so that a child item is included within the lottery range when a parent item has been set to an acquired state or an acquirable state. The lottery processing section 210 changes the set lottery range based on given information. Specifically, when performing a normal lottery process, the lottery range that specifies the lottery target items is fixed. In one embodiment of the invention, the lottery range is changed based on the given information. The given information is at least one piece of information among input information input by the player, status information about the player, game status information about the player, and charge information about the player, for example. Specifically, the lottery processing section 210 changes the lottery range of the lottery process based on at least one piece of information among the input information input by the player, the status information about the player, the game status information about the player, and the charge information about the player.

The input information input by the player refers to information that has been input by the player using the operation section 260, and has been received by the reception section 208. The input information input by the player may be instruction information (request information) input by the player in order to change the lottery range of the lottery process.

The status information about the player refers to information that is stored in the storage section 270 included in the game system as information that represents the status of the player. The status information about the player may be information about the game level (e.g., rank) of the player, information about the play time (e.g., total play time or cumulative play time (in the last period)), information about the play count (e.g., total play count or play frequency (in the last period)), or information about a game parameter (e.g., experience value, attack capability, or defense capability) used during the game process, for example.

The game status information may be information that represents the progress of the game, information about a stage or a mission during the game, information about a game space during the game, or information about the state around the player during the game, for example.

The charge information refers to information about the amount charged to the player. The charge information is used during the charge process performed by the charge processing section 216. The charge information is stored in the charge information storage section 277 included in the storage section 270. For example, personal information (e.g., name, sex, date of birth, and e-mail address) about the player is stored in the storage section 270 as user information. Account information about the player is also stored in the storage section 270 as the user information. The charge information stored in the charge information storage section 277 is linked to the account information about each player. Note that cash (money in the real world) or virtual money used on a network may be charged during the charge process. Alternatively, a right (e.g., game play right or sortie right) that can be acquired by paying cash or virtual money may be used during the charge process.

The item information storage section 274 included in the storage section 270 stores information about a plurality of items used in the game. For example, the item information storage section 274 stores item identification information (item number), item content information (e.g., image information), and the like.

In one embodiment of the invention, the information about the plurality of items stored in the item information storage section 274 has a data structure in which the plurality of items are linked to have a parent-child relationship. Specifically, the item information storage section 274 stores the information about the plurality of items to have a data structure in which a child-node item is linked to a parent-node item. For example, the item information storage section 274 stores the information about the plurality of items to have a tree structure, a mesh structure, a star structure, or the like.

The lottery processing section 210 sets the lottery range so that the child item (child-node item) is included within the lottery range on condition that the parent item (parent-node item) has been set to the acquired state or the acquirable state. Specifically, only some items among the plurality of items are set to be the lottery target, and belong to the lottery range in the initial state (default state). For example, only I items among J items (J>I) are set to be the lottery target, and belong to the lottery range in the initial state. When the pth item among the J items that belongs to the lottery range has been set to the acquired state (or the acquirable state), the qth item (child-node item) that is linked to the pth item (parent-node item) is set to be the lottery target, and additionally belongs to the lottery range. Therefore, the number of items that belong to the lottery range increases from I to I+1.

In one embodiment of the invention, the lottery processing section 210 variably changes the lottery range that is set to the plurality of items having the above data structure based on the input information input by the player, the status information about the player, the game status information about the player, the charge information about the player, or the like.

The lottery processing section 210 may change a lottery count of the lottery process based on at least one piece of information among the input information input by the player, the status information about the player, the game status information about the player, and the charge information about the player. For example, the lottery process is performed a number of times corresponding to the lottery count. For example, when one item is selected by one lottery process, a plurality of items are selected by performing the lottery process a number of times corresponding to the lottery count. The plurality of items selected by the lottery process are set to be acquisition candidates. In this case, the item selected by the first lottery process and the item selected by the second lottery process may be an identical item, for example. The lottery count is variably changed based on at least one piece of information (given information) among the input information input by the player, the status information about the player, the game status information about the player, and the charge information about the player.

The lottery processing section 210 may change at least one of the duration for which the lottery range remains changed, and the duration for which the lottery count remains changed, based on at least one piece of information among the input information input by the player, the status information about the player, the game status information about the player, and the charge information about the player. Specifically, when the lottery range or the lottery count has been changed, the duration for which the lottery range or the lottery count remains changed is variably changed based on the input information input by the player or the like. For example, when the lottery range has been changed from a first lottery range to a second lottery range, the lottery range is set to the second lottery range during the duration for which the lottery range remains changed. When the duration for which the lottery range remains changed has elapsed, the lottery range is returned to the first lottery range from the second lottery range. Likewise, when the lottery count has been changed from a first lottery count to a second lottery count, the lottery count is set to the second lottery count during the duration for which the lottery count remains changed. When the duration for which the lottery count remains changed has elapsed, the lottery count is returned to the first lottery count from the second lottery count.

The lottery processing section 210 may change at least one of the lottery range, the lottery count, the duration for which the lottery range remains changed, and the duration for which the lottery count remains changed, based on information about the team to which the player belongs, or information about another player who belongs to the team. For example, when the player plays a multiplayer game (e.g., network game), the player may belong to a team, and plays the game in cooperation with another player who belongs to the team. For example, a moving object (e.g., fighter aircraft, tank, or robot) operated by the player and a moving object operated by the other player cooperate to attack an enemy. The military results (game results) achieved by the team are given to the players who belong to the team. In this case, the lottery range or the lottery count is changed based on the information about the team (e.g., the game results (e.g., victory or defeat or military results) of the team, or the status information about the team), or the information about the other player (e.g., the input information input by the other player, the status information about the other player, the game status information about the other player, or the charge information about the other player). Alternatively, the duration for which the lottery range is changed, or the duration for which the lottery count remains changed, may be changed. This makes it possible to implement a more interesting multiplayer game.

The lottery processing section 210 changes the lottery range so that the lottery range is set based on an item that has been set to the acquired state or the acquirable state.

Specifically, the plurality of items stored in the item information storage section 274 are classified to belong to one class among first to Nth classes. In this case, the lottery processing section 210 sets the items that belong to the Lth to Kth ($1 \leq L \leq K \leq N$) classes among the first to Nth classes to be the lottery range setting target when the level of the player corresponds to the Kth class among the first to Nth classes. For example, when the level of the player corresponds to the first class, the lottery processing section 210 sets the items that belong to the first class to be the lottery range setting target. For example, when the level of the player corresponds to the second class, the lottery processing section 210 sets the items that belong to the first class and the second class to be the lottery range setting target. This makes it possible to set the lottery range corresponding to the class.

In this case, the lottery processing section 210 changes the lottery range so that the lottery range is set to the items that belong to the class selected from the Lth to Kth classes based on the given information (e.g., the input information input by the player, the status information about the player, the game status information about the player, or the charge information about the player). For example, when the items that belong to the first class and the second class among the first to third classes have been set to be the lottery range setting target, the lottery processing section 210 changes the lottery range so that the lottery range is set to the items that belong to the class selected from the first class and the second class based on the input information input by the player or the like. For example, when the input information input by the player or the like instructs to select the first class, the lottery range is limited to the items that belong to the first class. When the input information input by the player or the like instructs to select the second class, the lottery range is limited to the items that belong to the second class. This makes it possible to implement a lottery range change process that is effective when the items are classified into each class.

The lottery processing section 210 may perform a level change process that changes the level of an item that has been set to the acquired state or the acquirable state and has been selected by the lottery process. Specifically, the item acquisition processing section 212 normally performs the item acquisition process on an item that has been selected by the lottery process. However, when an item set to the acquired state (or the acquirable state) has been selected by the lottery process, the level change process that changes the level of the item is performed instead of performing the item acquisition process. For example, the level of the item is increased.

In this case, the lottery processing section 210 changes the lottery range so that the lottery range is set to the item that has been set to the acquired state or the acquirable state and is subjected to the level change process. For example, the lottery processing section 210 changes the lottery range so that the lottery range is limited to the item that is subjected to the level change process. Specifically, the lottery processing section 210 changes the lottery range so that the lottery range is set to the item that is subjected to the level change process, and is not set to the item that is subjected to the item acquisition process. This makes it possible to implement a lottery range change process that is effective for a system that can change the level of the item selected by a lottery.

The lottery processing section 210 selects an item from the lottery range by performing the lottery process on condition that the player has performed game play, or has finished game play, for example. Specifically, the lottery processing section 210 selects an item by performing the lottery process when it has been determined that the player has performed game play, or has finished game play. It may be determined that the player has finished game play when the game play time limit set to a game mission, a game stage, or the like has elapsed, or when the player has cleared a game mission, a game stage, or the like.

The item acquisition processing section 212 changes acquisition determination points of an item that has been selected from the lottery range. For example, the item acquisition processing section 212 increases the acquisition determination points. The item acquisition processing section 212 allows the player to acquire the item when the acquisition determination points have reached a given determination threshold value. Note that the item acquisition processing section 212 may allow the player to acquire an item that has been selected from the lottery range without calculating the acquisition determination points.

In this case, the lottery processing section 210 may perform the lottery process that determines the change value of the acquisition determination points of the item that has been selected from the lottery range. Specifically, when an item has been selected from the lottery range, the change value of the acquisition determination points of the item is determined by the lottery process. For example, first to kth change values are provided as the change value, and one change value is selected from the first to kth change values by performing the lottery process. The acquisition determination points of the item are changed according to the selected change value. In this case, the probability that each of the first to kth change values is selected may be varied, or may be fixed.

The item acquisition processing section 212 may set at least one of the change value of the acquisition determination points and the determination threshold value based on at least one piece of information among the input information input by the player, the status information about the player, the game status information about the player, and the charge information about the player. Specifically, the change value of the acquisition determination points or the determination threshold value is variably changed based on the status information about the player, the game status information about the player, the charge information about the player, or the like.

Figure 2A:
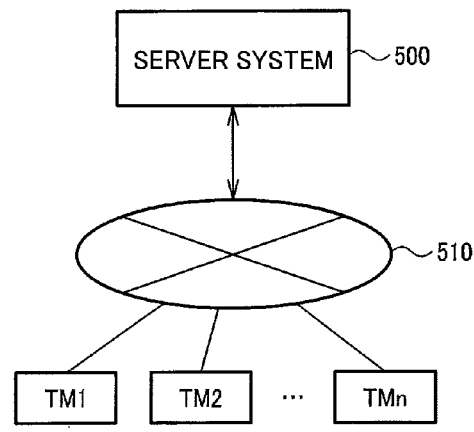
FIGS. 2A to 2E are views illustrating a network configuration and a terminal device.

FIG. 2A is a view illustrating an example of the network configuration of the game system according to one embodiment of the invention. In FIG. 2A, a server system 500 (information processing system) is connected to terminal devices TM1 to TMn through a network 510. For example, the server system 500 is a host, and the terminal devices TM1 to TMn are clients.

The server system 500 may be implemented by one or a plurality of servers (e.g., management server, game server, charge server, service providing server, content distribution server, authentication server, database server, or communication server), for example. The server system 500 provides various services for operating a community-type website and an online game. The server system 500 manages data necessary for implementing (executing) the game, and distributes a client program, various types of data, and the like.

The network 510 (distribution network or communication line) is a communication channel that utilizes the Internet, a wireless LAN, and the like. The network 510 may include a communication network such as a LAN that utilizes a private line (private cable) for direct connection, Ethernet (registered trademark), and the like, a telecommunication network, a cable network, and a wireless LAN. The communication method may be either a cable communication method or a wireless communication method.

Figure 2B:
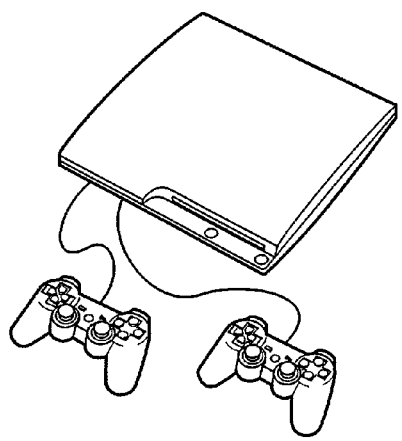
Figure 2C:
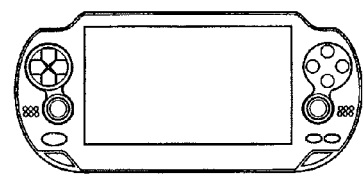
Figure 2D:
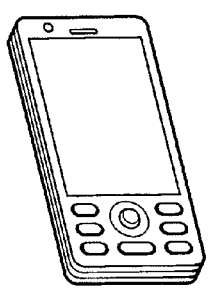
Figure 2E:
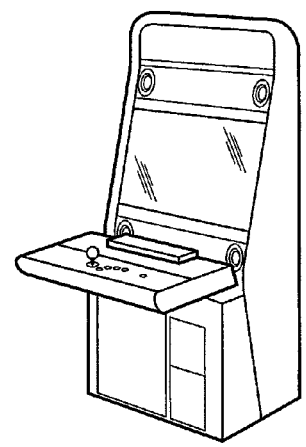

The terminal devices TM1 to TMn (player terminals) are terminals having a network connection function (Internet connection function), for example. The terminal devices TM1 to TMn may be a consumer game device (stationary game device) (see FIG. 2B), a portable game device (see FIG. 2C), a portable communication terminal (smartphone, futurephone, or mobile phone) (see FIG. 2D), an arcade game device (see FIG. 2E), or the like. An information processing device such as a personal computer (PC) or a tablet computer may also be used as the terminal devices TM1 to TMn.

The game system according to one embodiment of the invention may be implemented by the terminal devices (TM1 to TMn) illustrated in FIGS. 2A to 2E, for example. Alternatively, the game system according to one embodiment of the invention may be implemented by the server system 500, or may be implemented by distributed processing performed by the terminal device and the server system 500.

Figure 3:
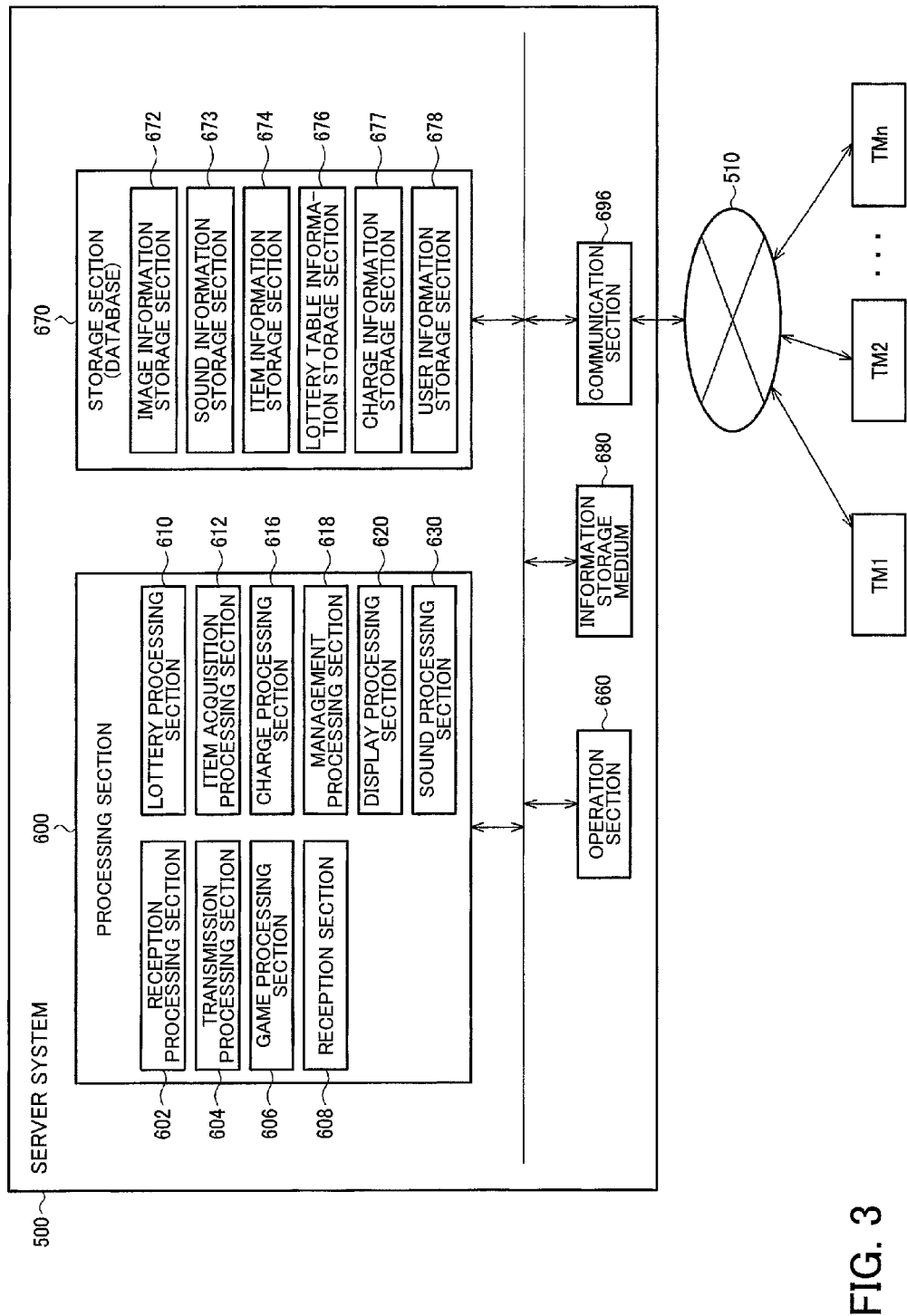
FIG. 3 illustrates a configuration example of a server system according to one embodiment of the invention.

FIG. 3 illustrates a configuration example when the game system according to one embodiment of the invention is implemented by the server system 500. The server system 500 illustrated in FIG. 3 includes a processing section 600, an operation section 660, a storage section 670, and a communication section 696.

The processing section 600 performs various processes necessary for implementing various types of service/management provided by the server based on data received through the communication section 696, data stored in the storage section 670, a program, and the like. The function of the processing section 600 may be implemented by hardware such as a processor (e.g., CPU or GPU) or an ASIC (e.g., gate array), or a program.

The processing section 600 includes a reception processing section 602, a transmission processing section 604, a game processing section 606, a reception section 608, a lottery processing section 610, an item acquisition processing section 612, a charge processing section 616, a management processing section 618, a display processing section 620, and a sound processing section 630.

The reception processing section 602 performs a reception process that receives information from the terminal device or the like. The transmission processing section 604 performs a transmission process that transmits information to the terminal device or the like. The reception process includes a process that instructs the communication section 696 to receive information, a process that acquires information received by the communication section 696, and writes the acquired information into the storage section 670, and the like. The transmission process includes a process that instructs the communication section 696 to transmit information, a process that indicates the transmission target information to the communication section 696, and the like.

The game processing section 606, the reception section 608, the lottery processing section 610, the item acquisition processing section 612, and the charge processing section 616 respectively perform (as the server system) a game process, a reception process, a lottery process, an item acquisition process, and a charge process similar to those performed by the game processing section 206, the reception section 208, the lottery processing section 210, the item acquisition processing section 212, and the charge processing section 216 described above with reference to FIG. 1, and detailed description thereof is omitted. The game process, the reception process, the lottery process, the item acquisition process, and the charge process may be implemented by the terminal device, or may be implemented by the server system (e.g., cloud). The game process, the reception process, the lottery process, the item acquisition process, and the charge process may be implemented by the terminal device, or may be implemented by distributed processing performed by the terminal device and the server system.

The management processing section 618 performs a server management process. For example, the management processing section 618 performs a management process that manages various services provided by the server, and a management process that manages various types of information such as server management information.

The display processing section 620 performs a process for displaying an image on the display section of the terminal device. The sound processing section 630 performs a process for outputting various types of sound from the sound output section of the terminal device. For example, the display processing section 620 generates image information that is information for generating an image, and the sound processing section 630 generates sound information that is information for generating sound (voice, game sound, or effect sound). The image information is information for each terminal device to generate and display an image generated by the method according to one embodiment of the invention. The image information may be image data, or may be data (e.g., display screen setting data or object data) for each terminal device to generate and display an image. This also applies to the sound information generated by the sound processing section 630.

The operation section 660 allows the system administrator (operator) to input various types of information.

The storage section 670 serves as a work area for the processing section 600, the communication section 696, and the like. The function of the storage section 670 may be implemented by a RAM, an SSD, an HDD, or the like.

The storage section 670 includes an image information storage section 672, a sound information storage section 673, an item information storage section 674, a lottery table information storage section 676, a charge information storage section 677, and a user information storage section 678. The image information storage section 672 stores the image information generated by the display processing section 620, and the sound information storage section 673 stores the sound information generated by the sound processing section 630. The item information storage section 674, the lottery table information storage section 676, and the charge information storage section 677 store information similar to those stored in the item information storage section 274, the lottery table information storage section 276, and the charge information storage section 277 described above with reference to FIG. 1.

The user information storage section 678 stores personal information (e.g., name, sex, date of birth, and e-mail address) about the player as user information. For example, account information about the player and the like are stored as the user information. The charge information is linked to the account information about each player.

An information storage medium 680 stores a program, data, and the like. The function of the information storage medium 680 may be implemented by an optical disk, a memory, an HDD, or the like.

The communication section 696 communicates with the terminal devices TM1 to TMn or another external server through the cable/wireless network 510. The function of the communication section 696 may be implemented by hardware (e.g., communication ASIC or communication processor), or communication firmware.

Note that the process (e.g., game process, reception process, sharing process, and recording process) according to one embodiment of the invention may be implemented by causing the terminal device to execute the game program, or may be implemented by executing a web browser program or script control. For example, the process according to one embodiment of the invention may be implemented as a browser game that acquires information necessary for the game through a communication line (e.g., Internet), and implements an interactive display on a browser.

2. Method

The method according to one embodiment of the invention is described in detail below.

2.1 Lottery Range Change Process

Figure 4A:
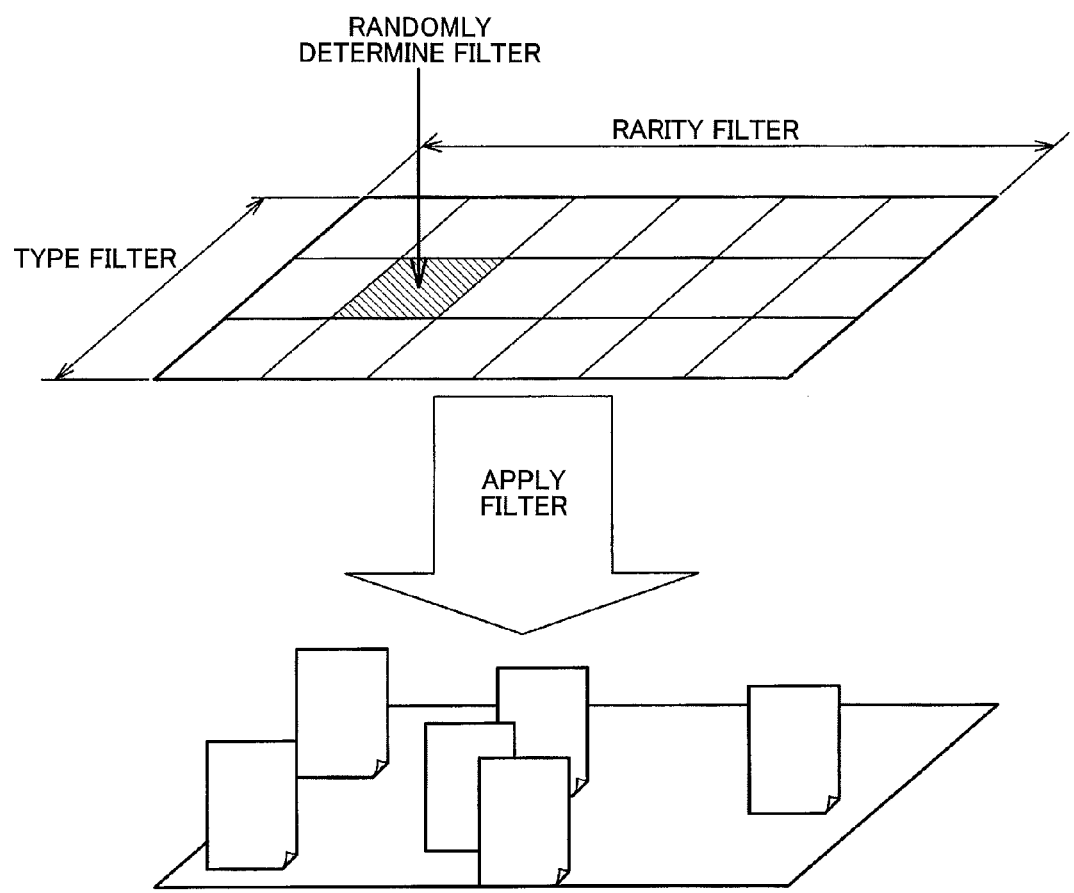
FIGS. 4A and 4B are views illustrating a method according to a first comparative example and a method according to a second comparative example.
Figure 4B:
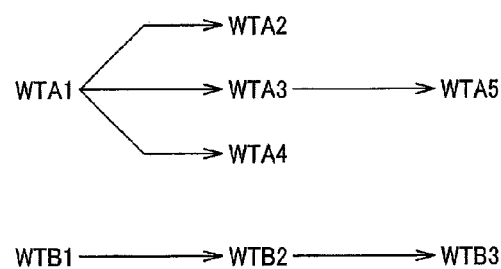

A game system has been known that allows the player to acquire an item as a result of game play. FIGS. 4A and 4B are views illustrating a first comparative example and a second comparative example with regard to acquisition of an item.

In the first comparative example illustrated in FIG. 4A, an item is selected (dropped) using a random filtering method. When using the random filtering method, a rarity filter and a type filter are provided. A lottery process to which these filters are applied is performed on condition that game play has started, or when game play has ended (i.e., when the game has been cleared) to randomly select an item (e.g., machine blueprint). In this case, an item selected by the lottery process is limited by the level (rank) of the player.

The second comparative example illustrated in FIG. 4B is an example of a tree growth method (machine growth method) in which the item information is provided with a tree data structure. The player plays a battle game using a machine WTA1 (e.g., tank) (i.e., item). When the player has cleared the game, the player acquires an experience value that is linked to the machine WTA1. When the experience value has reached a given value, the player can acquire child-node machines WTA2, WTA3, and WTA4 that are linked to the parent-node machine WTA1. For example, when the player desires to acquire a machine WTA5, the player plays the battle game using the machine WTA1 or the like that is linked to the machine WTA5 to acquire the experience value. When the player desires to acquire a machine WTB3, the player plays the battle game using a machine WTB1 or the like that is linked to the machine WTB3 to acquire the experience value. In the tree growth method illustrated in FIG. 4B, a machine (i.e., item) is not randomly selected, and a lottery process is not performed.

As a third comparative example, a material synthesis method may also be used. When using the material synthesis method, a material is randomly dropped when game play has ended, or during the game, and the dropped material is synthesized to develop a new item (character), or strengthen the item.

When using the random filtering method illustrated in FIG. 4A, a waste of time occurs until a strong machine can be acquired due to random selection. Therefore, it takes time for the player to acquire the strongest machine, and it is possible to suppress a situation in which the player gets tired of the game even if the number of machines provided by the game manufacturer is small. It is also possible to fuel the player's gambling spirit to prompt the player to play the game. Moreover, a vicious circle (i.e., widening gap between the players) in which a skilled player acquires a strong machine rarely occurs.

When using the random filtering method, however, since the player need not make much effort to acquire the desired machine, and cannot predict the timing at which the desired machine can be acquired, it is difficult to motivate the player to continue to play the game. Since the player may not be able to acquire the desired machine as a result of a lottery, the player may be easily disappointed. Moreover, an item that is to be dropped changes corresponding to the level (rank) of the player. For example, when the level of the player has increased, the player cannot acquire a machine that can be acquired when the level of the player is low.

The tree growth method illustrated in FIG. 4B has an advantage in that the player must make efforts to acquire the desired machine. Moreover, since the player can visually determine the machine that can be acquired by the player based on the tree structure, it is possible to motivate the player to play the game for a short time.

When using the tree growth method, however, since the player can efficiently acquire a strong machine in the quickest way, the game manufacturer must always add a machine in order to prevent a situation in which the player gets tired of the game. Moreover, since the player can steadily grow his machine through a simple operation, it is difficult to fully stimulate the player's gambling spirit.

The material synthesis method has a disadvantage in that it is very complex to manage the materials, and the interface mechanism becomes complex.

Figure 5:
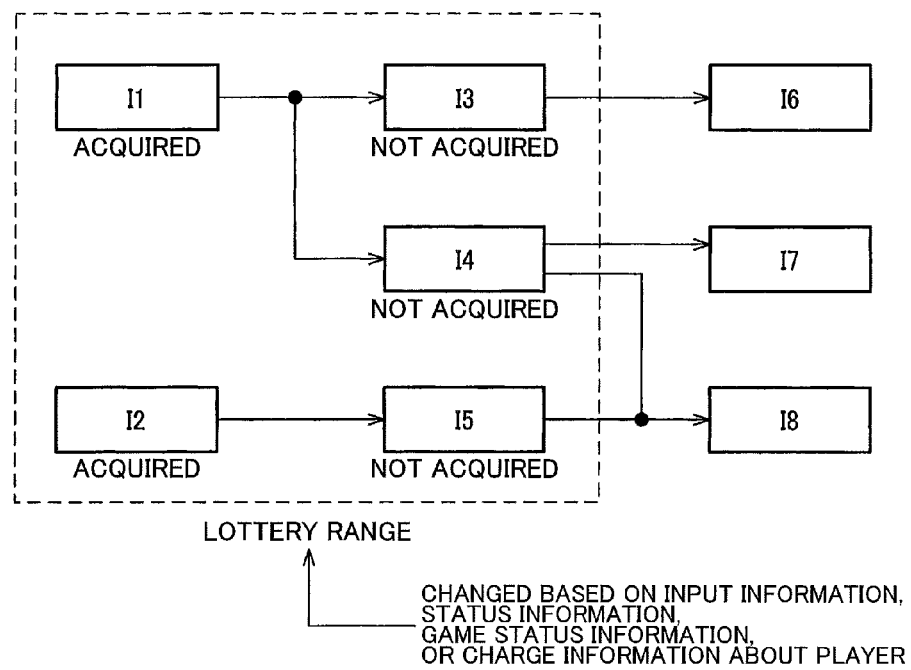
FIG. 5 is a view illustrating a method according to one embodiment of the invention.

In order to solve the above problems, one embodiment of the invention employs an item selection method illustrated in FIG. 5. In FIG. 5, a plurality of items I1 to I8 are provided as items that are used during the game, for example. Information about these items is stored in the item information storage section 274 illustrated in FIG. 1. Examples of the items include machines (e.g., fighter aircraft, tank, and car), parts (e.g., weapon and accessory), consumable supplies (e.g., fuel and ammunition), articles that produce an effect (e.g., magic), collections, dresses, accessories, and the like.

As illustrated in FIG. 5, a lottery range is set that specifies the lottery target items from the items I1 to I8. In FIG. 5, the lottery range is set so that the items I1 to I5 among the items I1 to I8 are set to be the lottery target, for example. The information about the items I1 to I8 has a data structure in which the items are linked to have a parent-child relationship, for example. The lottery range is set so that the child item is included within the lottery range when the parent item has been set to an acquired state (or an acquirable state).

In one embodiment of the invention, the lottery range is changed based on given information such as the input information input by the player, the status information about the player, the game status information about the player, or the charge information about the player.

For example, the lottery range is expanded, narrowed, set to be advantageous to the player, or set to be disadvantageous to the player based on the instruction indicated by the input information that has been input by the player using the operation section 260.

The lottery range is also variably changed based on the status information (e.g., game level, play time, play count, or game parameter) about the player. For example, the lottery range is expanded, narrowed, set to be advantageous to the player, or set to be disadvantageous to the player when the game level, the play time, the play count, or the game parameter of the player has changed. Alternatively, a different lottery range is linked to each status of the player in advance, and the lottery range is set to the lottery range linked to the status of the player corresponding to the status of the player.

The lottery range is also variably changed based on the game status information (e.g., the progress of the game) about the player. For example, the lottery range is expanded, narrowed, set to be advantageous to the player, or set to be disadvantageous to the player according to the progress of the game. Alternatively, a different lottery range is linked to each mission or each stage of the game in advance, and the lottery range is set to the lottery range linked to the mission or the stage of the game corresponding to the mission or the stage of the game.

The lottery range is also variably changed based on the charge information about the player. For example, the lottery range is expanded, narrowed, or set to be advantageous to the player when the player has paid a considerable amount of cash or virtual money (i.e., when the player has been charged a considerable amount). For example, the lottery range is changed so that a more advantageous item is included within the lottery range as the amount paid by the player increases.

An item is selected by the lottery process from the items that belong to the lottery range that has been variably changed. In this case, an item may be randomly selected in a state in which the winning rate of each item is set to be constant, for example. Alternatively, the winning rate of each item may be set based on the lottery table information stored in the lottery table information storage section 276 illustrated in FIG. 1, and an item may be selected by performing the lottery process based on the winning rate, for example.

When an item has been selected by the lottery process, a process that allows the player to acquire the selected item is performed. For example, the player is allowed to acquire the selected item unconditionally. Alternatively, when an item has been selected by the lottery process, the acquisition determination points of the lottery process are changed, and the player is allowed to acquire the selected item when the determination points have been reached (described later).

The information about the items I1 to I8 illustrated in FIG. 5 is stored in the item information storage section 274 to have a data structure (e.g., tree structure or mesh structure) in which the child-node item is linked to the parent-node item. The data structure is set so that the child-node item is included within the lottery range on condition that the parent-node item has been set to the acquired state (or the acquirable state).

In FIG. 5, the items I1 and I2 and the items I3, I4, and I5 have a parent-child relationship. Since the parent-node items I1 and I2 have been set to the acquired state (or the acquirable state), the child-node items I3, I4, and I5 are included within the lottery range. The items I3, I4, and I5 and the items I6, I7, and I8 also have a parent-child relationship. Since the parent-node items I3, I4, and I5 have not been set to the acquired state (or the acquirable state), the child-node items I6, I7, and I8 are excluded from the lottery range.

In FIG. 5, the lottery range is set to the items for which the information is stored to have a parent-child data structure, and variably changed based on the given information (e.g., the input information input by the player). This makes it possible to combine the advantages achieved by the random filtering method and the advantages achieved by the tree growth method.

Specifically, since the method illustrated in FIG. 5 selects an item by the lottery process, it is possible to fuel the player's gambling spirit to prompt the player to play the game, for example. Therefore, the method illustrated in FIG. 5 has a high affinity for a play charge system referred to as "stamina system". Moreover, since a waste of time occurs until a good item can be acquired due to selection by the lottery process, it takes time for the player to acquire the strongest item, and it suffices for the game manufacturer to provide a small number of items. This makes it possible to save the storage capacity of the storage section, and reduce game development man-hours, for example.

Since the lottery range of the lottery process is set to the items having a parent-child data structure, it is possible to allow the player to enjoy growing an item based on the tree structure. Therefore, the player feels that he has made efforts to acquire the desired item. Since the player can visually determine the item that can be acquired by the player through selection, it is possible to motivate the player to continue to play the game. Moreover, since it is possible to suppress a situation in which the item that can be acquired by the player changes corresponding to the level (rank) of the player, it is possible to eliminate the disadvantage of the random filtering method.

Since the lottery range is variably changed based on the input information input by the player, for example, it is possible to allow the player to enjoy a wide variety of item acquisition strategy, and provide a more interesting item acquisition game.

Figure 6:
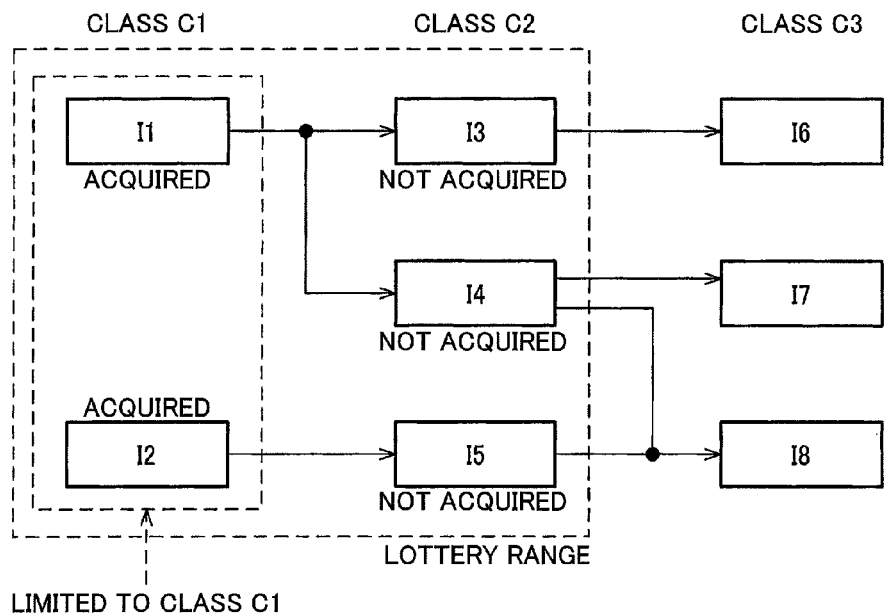
FIG. 6 is a view illustrating an example of a lottery range change process.

FIG. 6 is a view illustrating an example of the lottery range change process. In FIG. 6, the items I1 to I8 are classified to belong to a class among classes C1 to C3 (first to Nth classes in a broad sense). For example, items I1 and I2 belong to the class C1, the items I3, I4, and I5 belong to the class C2, and the items I6, I7, and I8 belong to the class C3.

For example, when the level of the player corresponds to the class C2 (Kth class in a broad sense) among the classes C1 to C3, the items I1, I2, I3, I4, and I5 that belong to the classes C1 and C2 (Lth to Kth classes in a broad sense) are included within the lottery range (see FIG. 6). Specifically, when the level of the player corresponds to the class C1, the items I1 and I2 that belong to the class C1 are included within the lottery range. When the level of the player has increased, and corresponds to the class C2, the items I3, I4, and I5 are included within the lottery range in addition to the items I1 and I2.

In this case, the lottery range can be changed based on the given information (e.g., the input information input by the player). In FIG. 6, the lottery range is limited to the items that belong to the class C1 based on the input information input by the player, for example. Specifically, the lottery range (default lottery range) that includes the items I1 to I5 that belong to the classes C1 and C2 is limited to the class C1 by the lottery range change process, so that only the items I1 and I2 are set to be the lottery target.

For example, even when the level of the player has increased so that the player can acquire the items I3 to I5 that belong to the class C2, the player may very much like the items I1 and I2 that belong to the class C1, and desire to acquire the items I1 and I2 that belong to the class C1. Alternatively, the player may desire to increase the level of the items I1 and I2 that belong to the class C1 through an item level change process (described later). In such a case, the player inputs information that instructs to limit the lottery range to the class C1. Therefore, the lottery range is narrowed so that only the items I1 and I2 that belong to the class C1 are set to be the lottery target, and it is likely that the player can acquire the items I1 and I2 that belong to the class C1.

It is also possible to change the lottery range so that the lottery range is limited to the class C2. For example, when the player has paid cash or virtual money, the lottery range is limited to the class C2 based on the charge information. Specifically, the lottery range that includes the items I1 to I5 is limited to the items I3 to I5 that belong to the class C2. Therefore, it is likely that the player can acquire the items I3 to I5 that belong to the class C2, and the player can advantageously proceed with the game.

In one embodiment of the invention, when an item that has been set to the acquired state (or the acquirable state (hereinafter the same)) has been selected by the lottery process, the level of the selected item may be changed (item level change process).

Figure 7A:
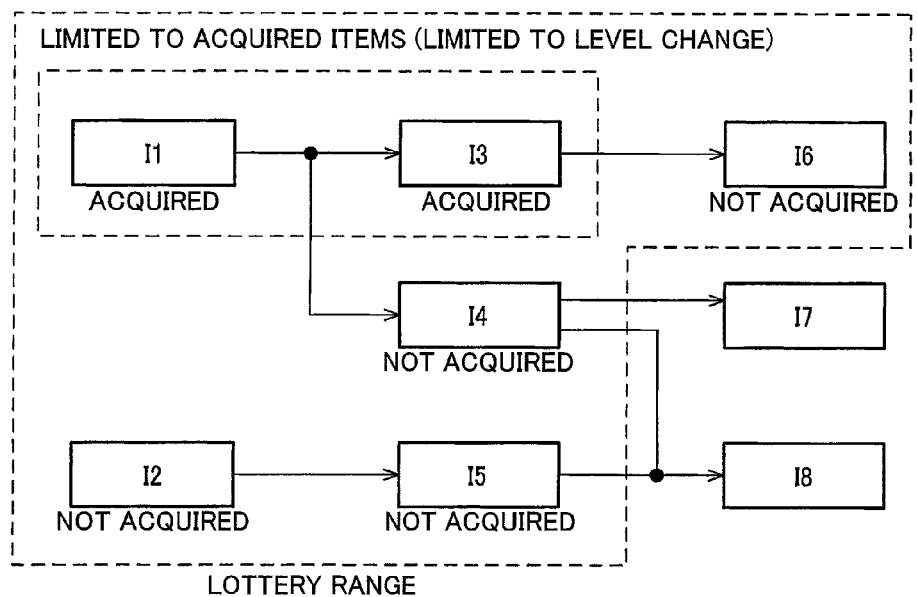
FIGS. 7A and 7B are views illustrating another example of a lottery range change process.

In FIG. 7A, the items I1 to I6 are included within the lottery range, for example. The items I2, I4, I5, and I6 among the items I1 to I6 have not been acquired, and the items I1 and I3 among the items I1 to I6 have been set to the acquired state. When the lottery process has been performed using the lottery range illustrated in FIG. 7A, and the item I1 or I3 that has been set to the acquired state has been selected, the level of the selected item is changed. For example, the level of the item is increased. When the item I2, I4, I5, or I6 that has not been acquired has been selected by the lottery process, the acquisition determination points of the selected item are increased (see FIG. 9A).

In FIG. 7A, the lottery range is limited to the items I1 and I3 that have been set to the acquired state based on the input information input by the player, for example. Specifically, the lottery range that includes the items I1 to I6 is changed to include only the items I1 and I3 that have been set to the acquired state, and the items I2, I4, I5, and I6 that have not been acquired are excluded from the lottery target. This makes it possible to deal with a situation in which the player desires to increase the level of the items I1 and I3 that have been set to the acquired state, for example.

Figure 7B:
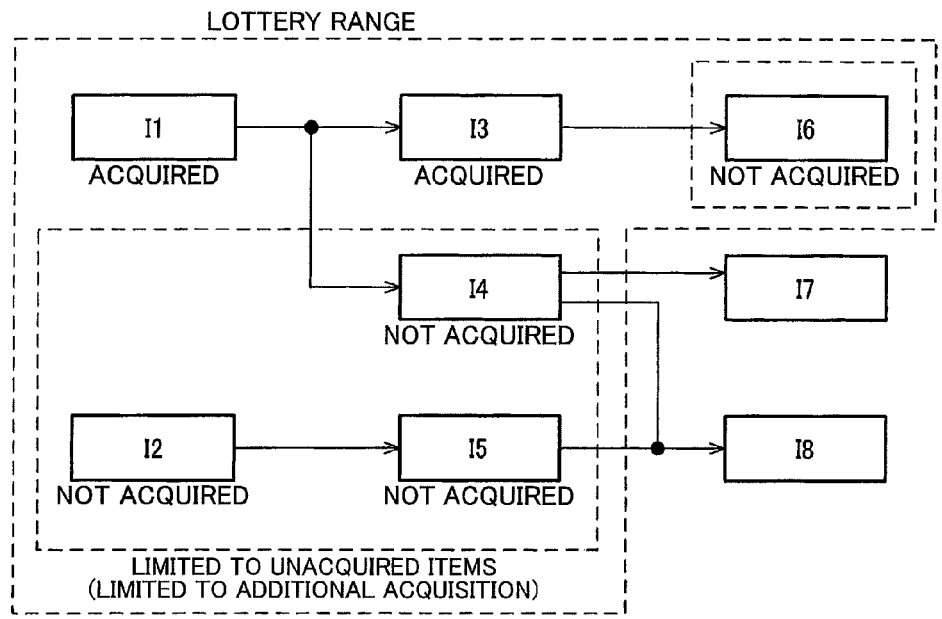

In FIG. 7B, the lottery range is limited to the items I2, I4, I5, and I6 that have not been acquired based on the input information input by the player, for example. Specifically, the lottery range is changed to include only the items I2, I4, I5, and I6 that have not been acquired, and the items I1 and I3 that have been set to the acquired state are excluded from the lottery target. This makes it possible to deal with a situation in which the player desires to acquire the items I2, I4, I5, and I6 that have not been acquired, for example.

According to one embodiment of the invention, it is possible to successfully meet various player demands, and allow the player to enjoy a wide variety of strategic item acquisition processes by variably changing the lottery range of the lottery process based on the given information, for example.

Figure 8A:
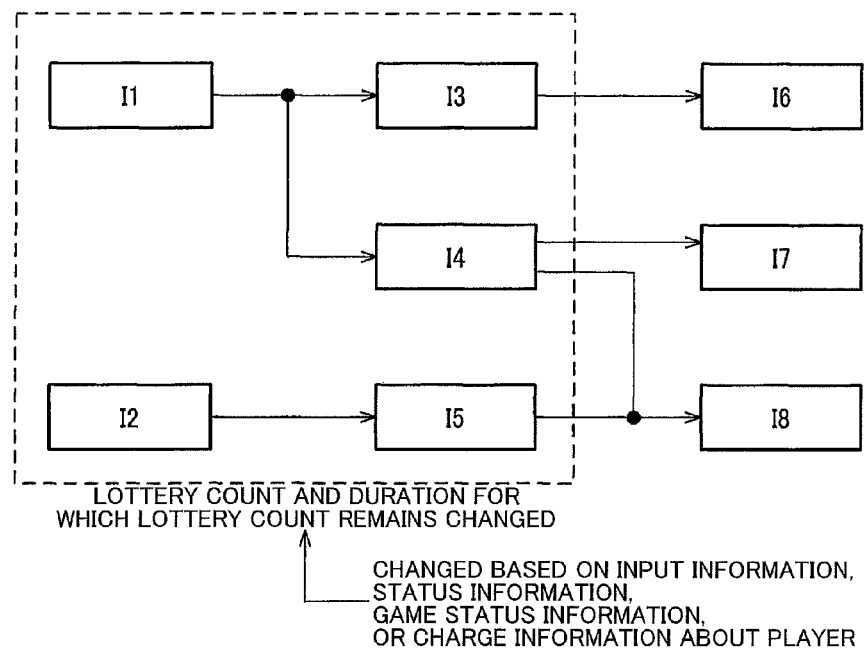
FIGS. 8A and 8B are views illustrating a lottery count/duration change process.

As illustrated in FIG. 8A, the lottery count of the lottery process may be changed, or the duration for which the lottery range or the lottery count remains changed may be changed based on the given information such as the input information input by the player, the status information about the player, the game status information about the player, or the charge information about the player. Specifically, the lottery count is increased or decreased, or the duration for which the lottery range or the lottery count remains changed is increased or decreased based on the given information. For example, when the player has paid a considerable amount of cash or virtual money (i.e., when the player has been charged a considerable amount), the lottery count is increased, or the duration for which the lottery range or the lottery count is changed remains increased. For example, when the duration for which the lottery range remains changed has been increased, a state in which the lottery range is changed (see FIGS. 6, 7A, and 7B) continues for a long time. When the duration for which the lottery count remains changed has been increased, a state in which the lottery count is changed continues for a long time. This makes it possible for the player to advantageously proceed with the lottery process. For example, when the lottery count has been decreased, and the duration for which the lottery count remains changed has been increased, the lottery process proceeds disadvantageously to the player (i.e., it is possible to penalize the player).

Figure 8B:
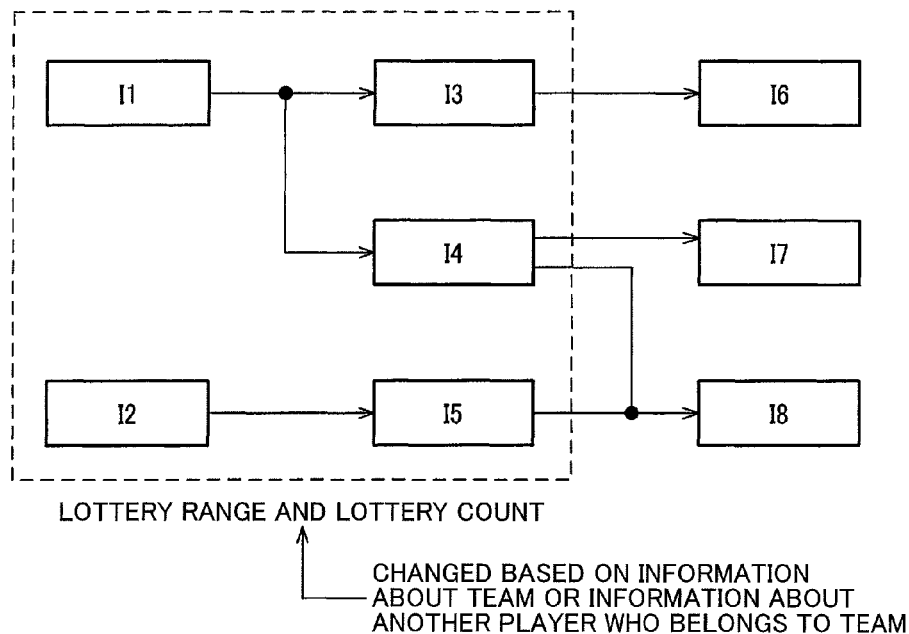

In FIG. 8B, the lottery range of the lottery process, or the lottery count of the lottery process, is changed based on information about the team to which the player belongs, or information about another player who belongs to the team. For example, when the team to which the player belongs has won the game, the lottery range is set to be advantageous to the player, or the lottery count is increased. This makes it possible to create a situation that is advantageous to the team or the player who belongs to the team. When another player who belongs to the team has paid a considerable amount of cash or virtual money (i.e., when the other player has been charged a considerable amount), the lottery range of the lottery process is set to be advantageous to the player who belongs to the team, or the lottery count is increased. In this case, the player who belongs to the team can advantageously proceed with the game due to the charge information about the other player who belongs to the team.

Figure 9A:
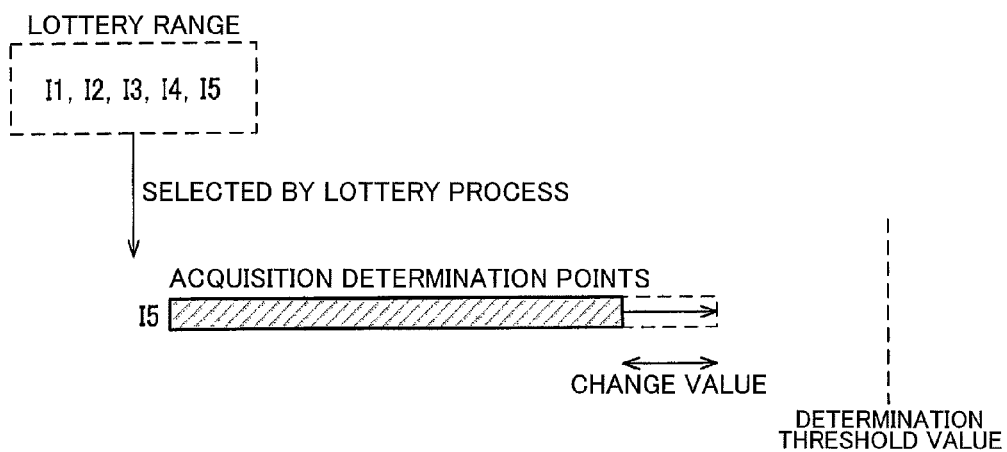
FIGS. 9A and 9B are views illustrating an item acquisition process.
Figure 9B:
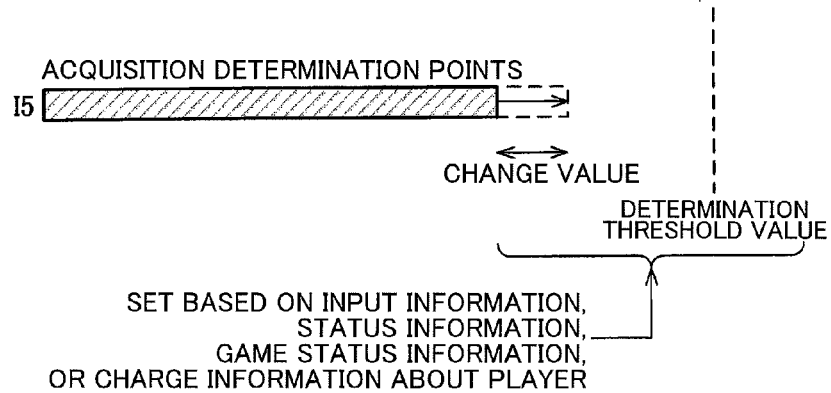

FIGS. 9A and 9B are views illustrating an example of the item acquisition process. In FIG. 9A, an item is selected from the lottery range by performing the lottery process on condition that the player has performed game play, or has finished game play, for example. In FIG. 9A, the item I5 has been selected from the items I1 to I5 by performing the lottery process, for example.

When the item I5 has been selected from the lottery range, the acquisition determination points of the selected item I5 change. In FIG. 9A, the acquisition determination points increase by a given change value, for example. The player can acquire the item when the acquisition determination points have reached the determination threshold value.

According to this configuration, an item is selected by the lottery process, and the acquisition determination points of the selected item change as the player repeats game play. The player can acquire the item by repeating game play a number of times. This makes it possible to fuel the player's gambling spirit to prompt the player to play the game.

In FIG. 9B, the change value of the acquisition determination points or the determination threshold value is set based on the input information input by the player, the status information about the player, the game status information about the player, the charge information about the player, or the like. For example, the change value of the acquisition determination points is increased or decreased, or the determination threshold value is increased or decreased corresponding to the instruction information input by the player, the game level of the player, or the progress of the game. For example, the change value of the acquisition determination points is increased, or the determination threshold value is decreased as the game level of the player increases. This makes it possible to set the item acquisition process to be advantageous to the player. Alternatively, the change value of the acquisition determination points is increased or decreased, or the determination threshold value is increased or decreased based on the charge information about the player. For example, the change value of the acquisition determination points is increased, or the determination threshold value is decreased when the player has paid a considerable amount of cash or virtual money (i.e., when the player has been charged a considerable amount). This makes it possible to set the item acquisition process to be advantageous to the player.

In FIGS. 9A and 9B, the lottery process that determines the change value of the acquisition determination points of the selected item may be performed in addition to the lottery process that selects an item. Specifically, the change value of the acquisition determination points is determined by the lottery process in addition to selecting an item by the lottery process. This makes it possible to reflect the lottery process in item acquisition in various ways.

2.2 Game Application

An example in which the method according to one embodiment of the invention is applied to a game is described below. In the following example, the method according to one embodiment of the invention is applied to a fighter aircraft game.

The fighter aircraft game is designed so that the player attacks an enemy position and the like by operating a fighter aircraft, and the game is cleared when a mission assigned to the player has been achieved. A game mode referred to as a team battle mode is also provided. In the team battle mode, a team formed by friend players and a team formed by competing players compete for military results. One of the teams with a higher total score wins the game.

The fighter aircraft game is also provided with an airframe (aircraft)/part research & development mode. When the player has succeeded in the development of an airframe and parts through research, the player can select the developed airframe to make a sortie during game play. The method according to one embodiment of the invention is applied to the airframe/part research & development mode.

Figure 10:
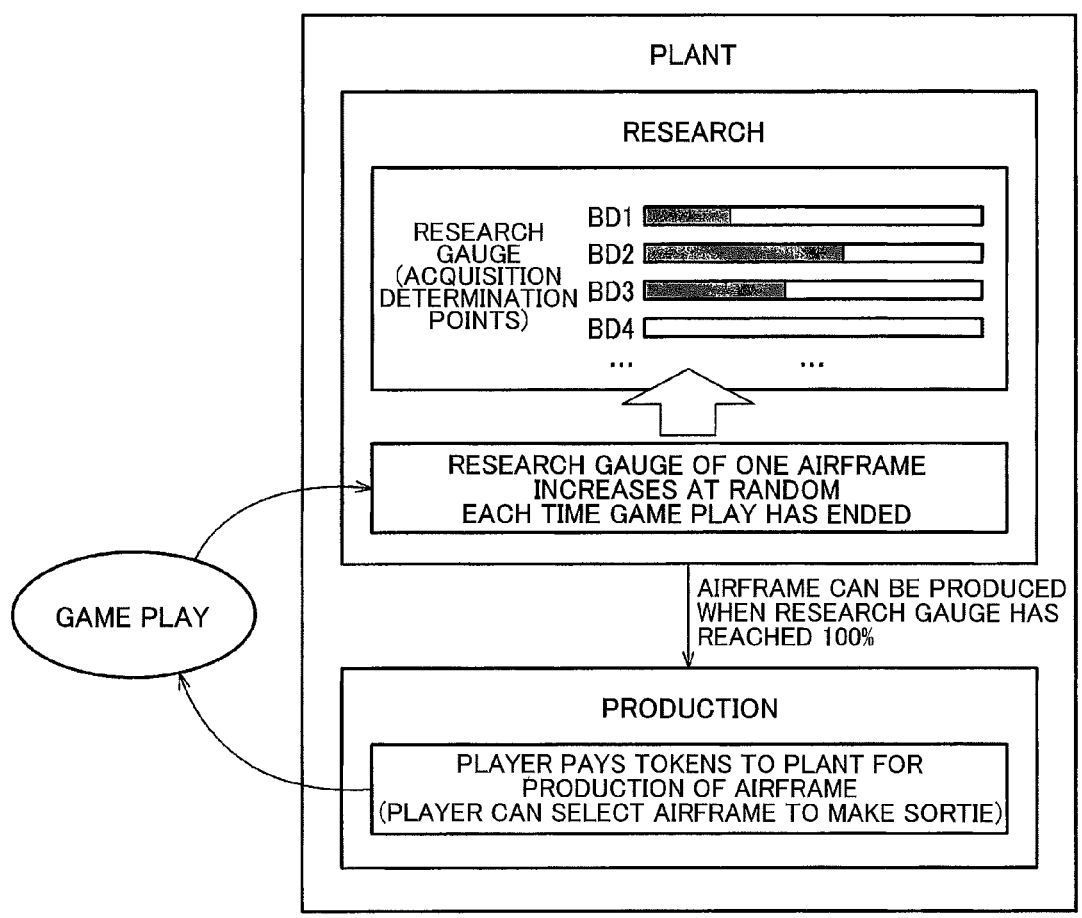
FIG. 10 is a view illustrating an example in which a method according to one embodiment of the invention is applied to a game.

As illustrated in FIG. 10, the player makes a contract with a plant (factory) in the research & development mode, and requests the plant to conduct research and development of a new airframe, for example. Specifically, each time the player has finished game play, a research gauge of an airframe among the research target airframes increases at random. The airframe can be produced when the research gauge has reached 100%. The player then pays tokens (in-game money) to the plant for production of the airframe. When production of the airframe has completed, the player can select the airframe to make a sortie.

In FIG. 10, an airframe is selected by the lottery process described above with reference to FIG. 5 and the like each time the player has finished game play. For example, airframes BD1, BD2, BD3, BD4, and the like illustrated in FIG. 10 are the lottery target included within the lottery range described above with reference to FIG. 5 and the like. The research gauge corresponds to the acquisition determination points described above with reference to FIG. 9A. When an airframe has been selected by the lottery process, the research gauge (acquisition determination points) of the airframe increases.

The acquired state of an item described above with reference to FIGS. 7A and 7B corresponds to a state in which production of an airframe (item) has completed in FIG. 10. The acquirable state of an item corresponds to a state in which the research gauge (acquisition determination points) has reached 100% (determination threshold value), and the airframe can be produced.

In one embodiment of the invention, the number of lottery target airframes is increased when a new research class has been unlocked during the game (described in detail later). Specifically, the lottery range is expanded in FIG. 5. The player can narrow the range of airframes selected by the lottery process by paying tokens (in-game money) to the plant. Specifically, the lottery range can be limited in FIG. 5. For example, when the player has built an additional plant (or extended the existing plant) in exchange for the payment of cash or virtual money, the number of airframes for which the research gauge increases when the player has finished game play increases. Specifically, the lottery count is increased when the player has built an additional plant (or extended the existing plant), and the number of airframes for which the acquisition determination points increase when the player has finished game play increases.

FIG. 11 illustrates the actions performed by the player during the game according to one embodiment of the invention. As illustrated in FIG. 11, the player plays the game to increase the research gauge (acquisition determination points) of the airframe. The player proceeds with the game to increase the game level of the player, and unlocks a new research class to create an opportunity for acquiring the desired airframe. The player sends a research request to the plant in exchange for the collected tokens, and increases the probability that the desired airframe is acquired (selected) by limiting the lottery range, for example. The player builds an additional plant (or extends the existing plant) in exchange for the payment of money (cash or virtual money) (e.g., increases the lottery count) so that the research proceeds promptly, and the player can promptly acquire the desired airframe, for example.

Figure 12:
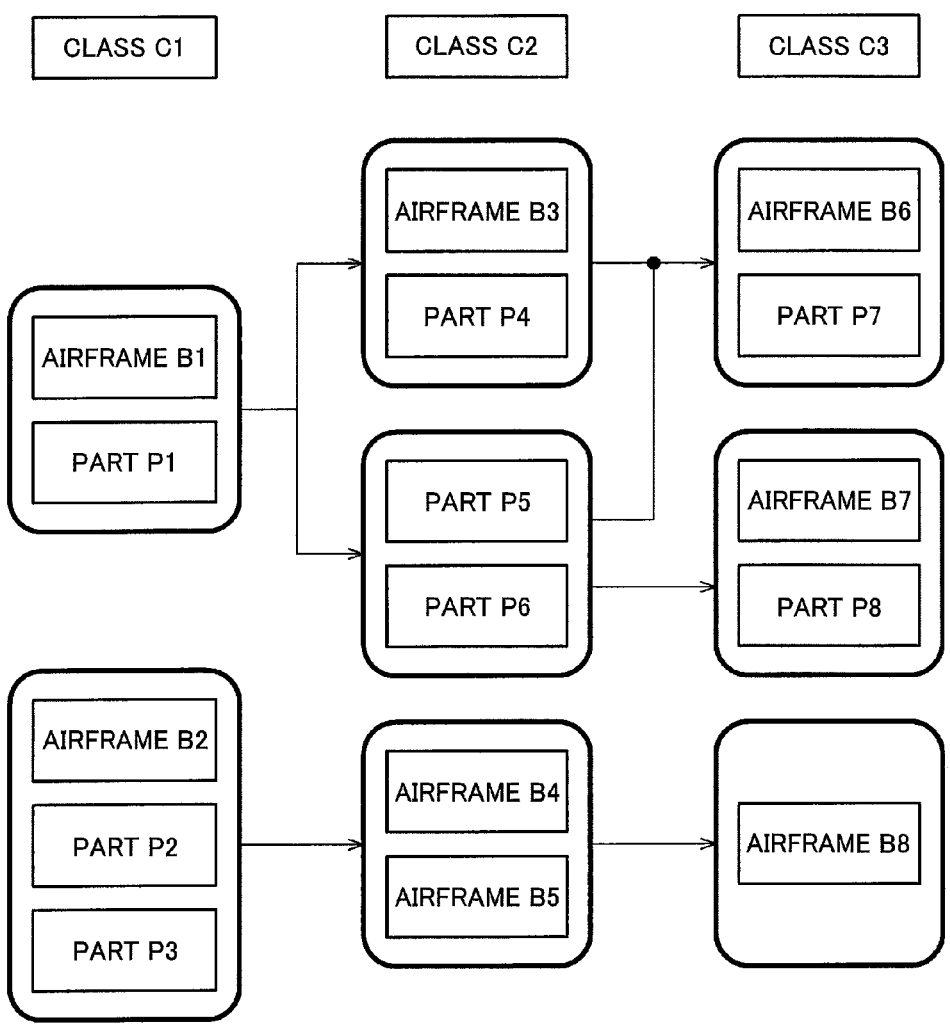
FIG. 12 is a view illustrating the data structure of item information.

FIG. 12 illustrates an example of the tree structure of airframes and parts (items in a broad sense). An airframe and a part are elements of each node of the tree structure, and one to three airframes/parts form one group. In FIG. 12, an airframe B1 and a part P1 form a first group, an airframe B2, a part P2, and a part P3 form a second group, and an airframe B3 and a part P4 form a third group, for example. The other groups are formed similarly.

In FIG. 12, a tree structure is formed in which the groups have a parent-child relationship. For example, the group formed by the airframe B1 and the part P1 is a parent-node group, and the group formed by the airframe B3 and the part P4 and the group formed by the part P5 and the part P6 are child-node groups. Likewise, the group formed by the airframe B2, the part P2, and the part P3 is a parent-node group, and the group formed by the airframe B4 and the airframe B5 is a child-node group.

These groups are classified into research classes C1 to C3. The class C1 is a class at a low research level, and the class C3 is a class at a high research level. For example, the group formed by the airframe B1 and the part P1, and the group formed by the airframe B2, the part P2, and the part P3 belong to the class C1, and the group formed by the airframe B3 and the part P4, the group formed by the part P5 and the part P6, and the group formed by the airframe B4 and the airframe B5 belong to the class C2. This also applies to the class C3.

When the research (and production) of all of the airframes/parts included in each group has completed (acquired state), the child-node group linked to each parent-node group is included within the lottery range (lottery target).

Figure 13:
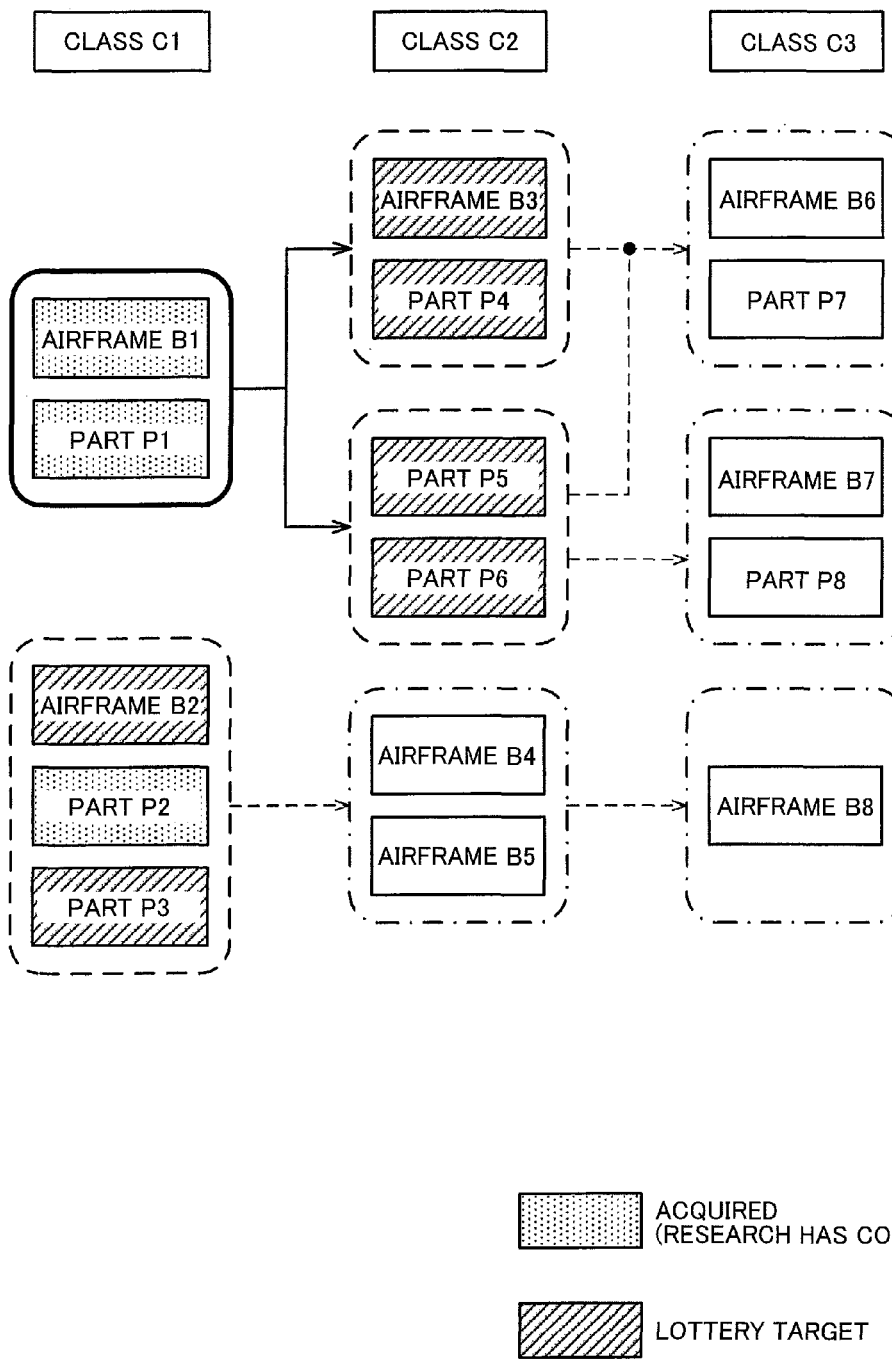
FIG. 13 is a view illustrating a lottery range setting process.

FIG. 13 illustrates a state in which the research has progressed (i.e., the research gauge has increased) as a result of repeated game play (e.g., the research has completed in the order of the airframe B1, the part P2, and the part P1 (i.e., the airframe B1, the part P2, and the part P1 have been set to the acquired state)).

In this case, the research of the group formed by the airframe B1 and the part P1 has completed. Therefore, the group formed by the airframe B3 and the part P4 and the group formed by the part P5 and the part P6 that are linked to the group formed by the airframe B1 and the part P1, are additionally included within the lottery range. Note that the group formed by the airframe B1 and the part P1 is a parent-node group, whereas the group formed by the airframe B3 and the part P4 and the group formed by the part P5 and the part P6, are child-node groups.

Therefore, the airframes B2 and B3 and the parts P3, P4, P5, and P6 are set to be the lottery target (see each box in which diagonal lines are drawn) (i.e., the total number of lottery target airframes/parts is 6). Specifically, one airframe/part is selected from the six lottery target airframes/parts.

When a level increase process is performed on an airframe for which the research has completed, the airframe B1 for which the research has completed and which has been set to the acquired state is also set to be the lottery target. Specifically, the airframe B1 is included within the lottery range, and subjected to the lottery process.

Figure 14:
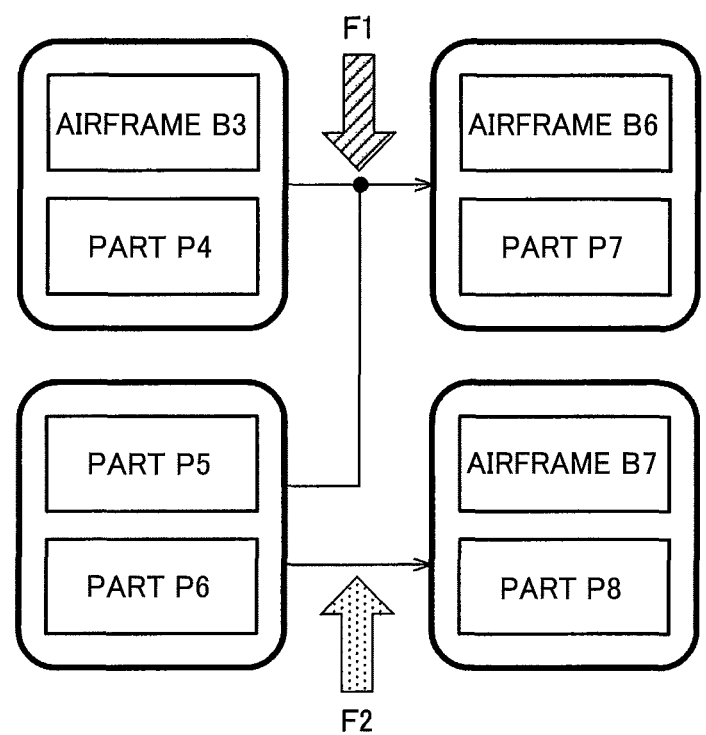
FIG. 14 is a view illustrating the relationship between a parent-node item and a child-node item.

As illustrated in FIG. 14 (see F1), whether or not the group that is linked to two groups is set to be the lottery target is determined using an AND condition. For example, the group formed by the airframe B6 and the part P7 (see FIG. 14) is set to be the lottery target when the research of the group formed by the airframe B3 and the part P4 and the research of the group formed by the part P5 and the part P6 have completed. When a parent-node group is linked to two child-node groups (see F2 in FIG. 14), the group formed by the airframe B7 and the part P8 is set to be the lottery target when the research of the group formed by the part P5 and the part P6 has completed, for example.

Figure 15:
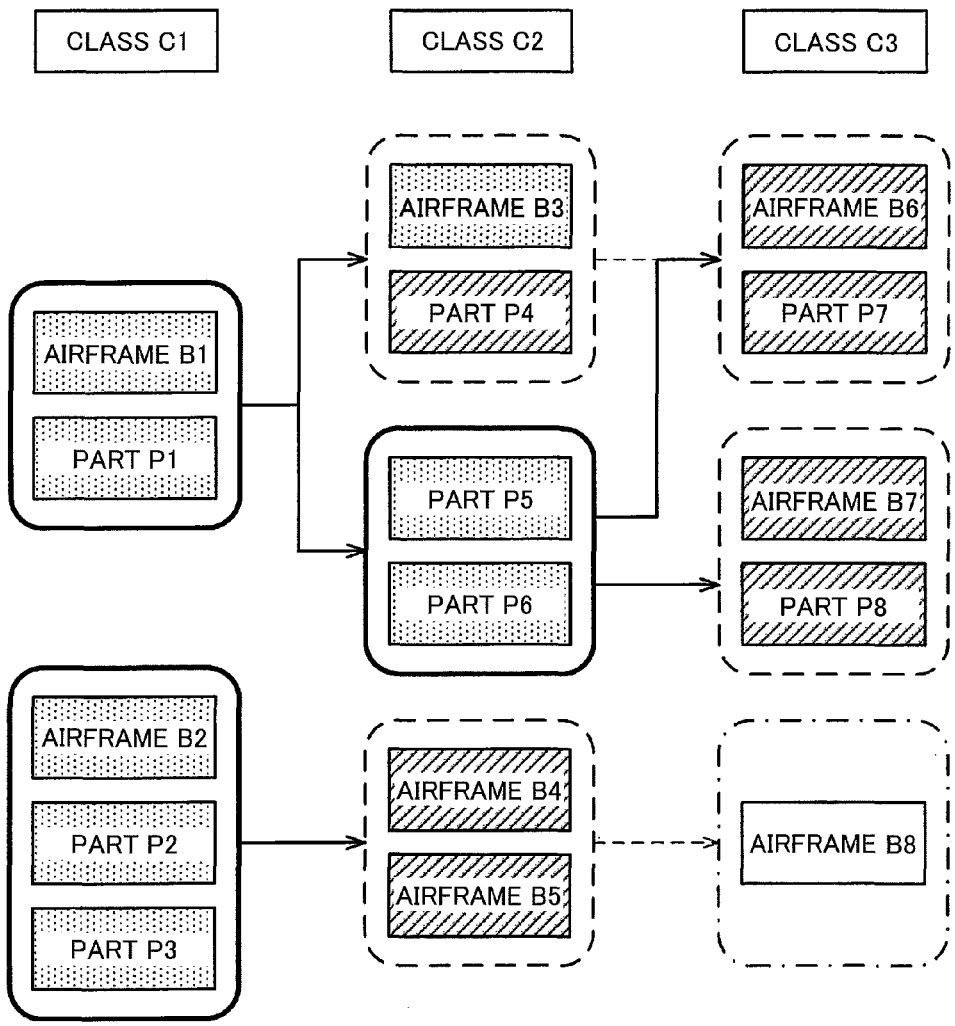
FIG. 15 is a view illustrating a lottery range setting process.

For example, when the research has progressed from the state illustrated in FIG. 13, and the research of the airframes B2 and B3 and the parts P3, P5, and P6 has completed (see FIG. 15), the airframes B4, B5, B6, and B7 and the parts P4, P7, and P8 are set to be the lottery target (i.e., the total number of lottery target airframes/parts is 7). Specifically, one airframe/part is selected from the seven lottery target airframes/parts.

Figure 16:
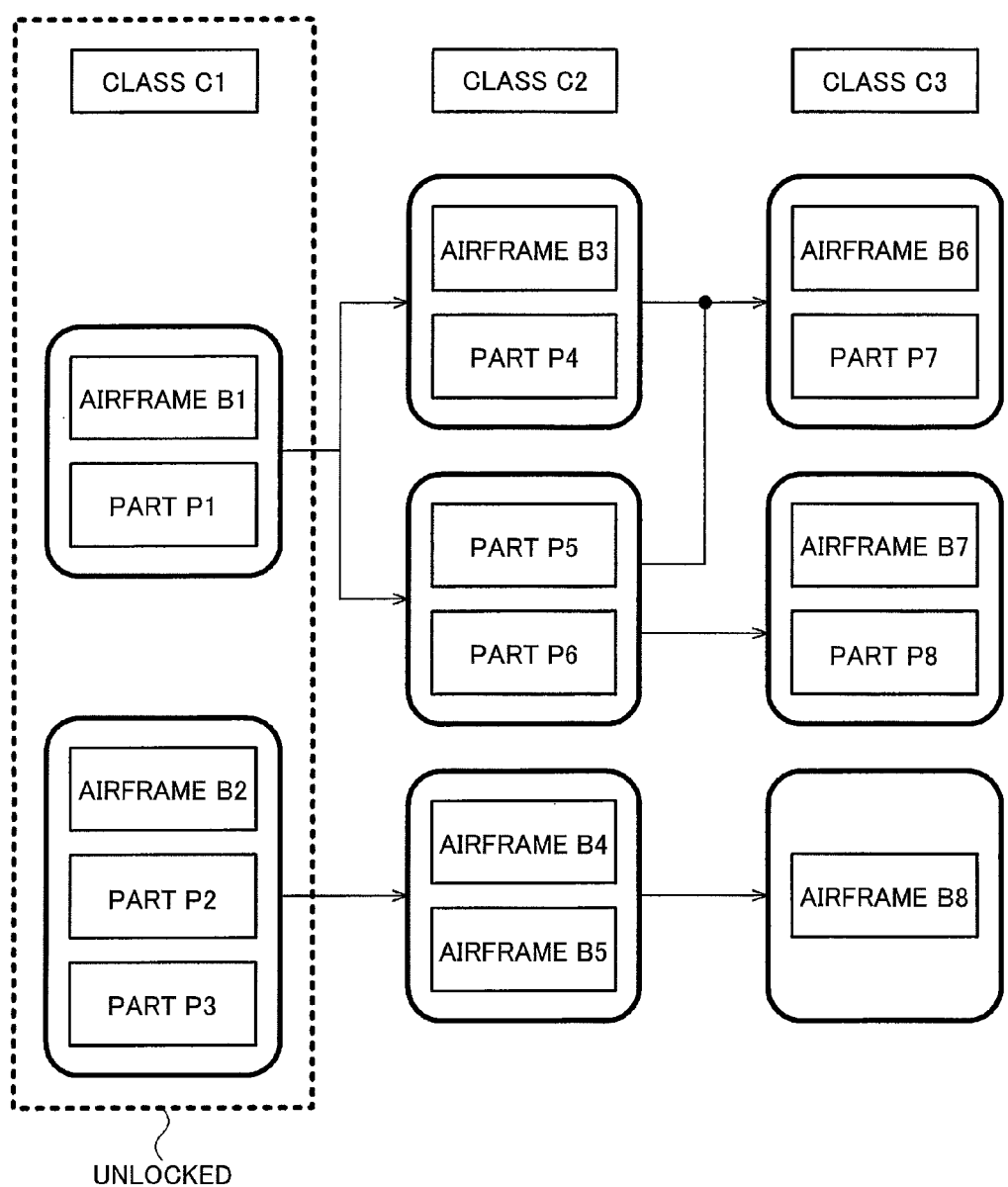
FIG. 16 is a view illustrating an item class.

In one embodiment of the invention, the items (airframes and parts) are classified into the research classes C1 to C3. As illustrated in FIG. 16, only the class C1 is unlocked, and the classes C2 and C3 are not unlocked in the initial state. The airframes and the parts that belong to each unlocked class are necessarily excluded from the lottery target. For example, since only the class C1 is unlocked in FIG. 16, the group formed by the airframe B3 and the part P4, the group formed by the part P5 and the part P6, and the group formed by the airframe B4 and the airframe B5 that belong to the class C2, and the group formed by the airframe B6 and the part P7, the group formed by the airframe B7 and the part P8, and the airframe B8 that belong to the class C3, are necessarily excluded from the lottery target.

Figure 17:
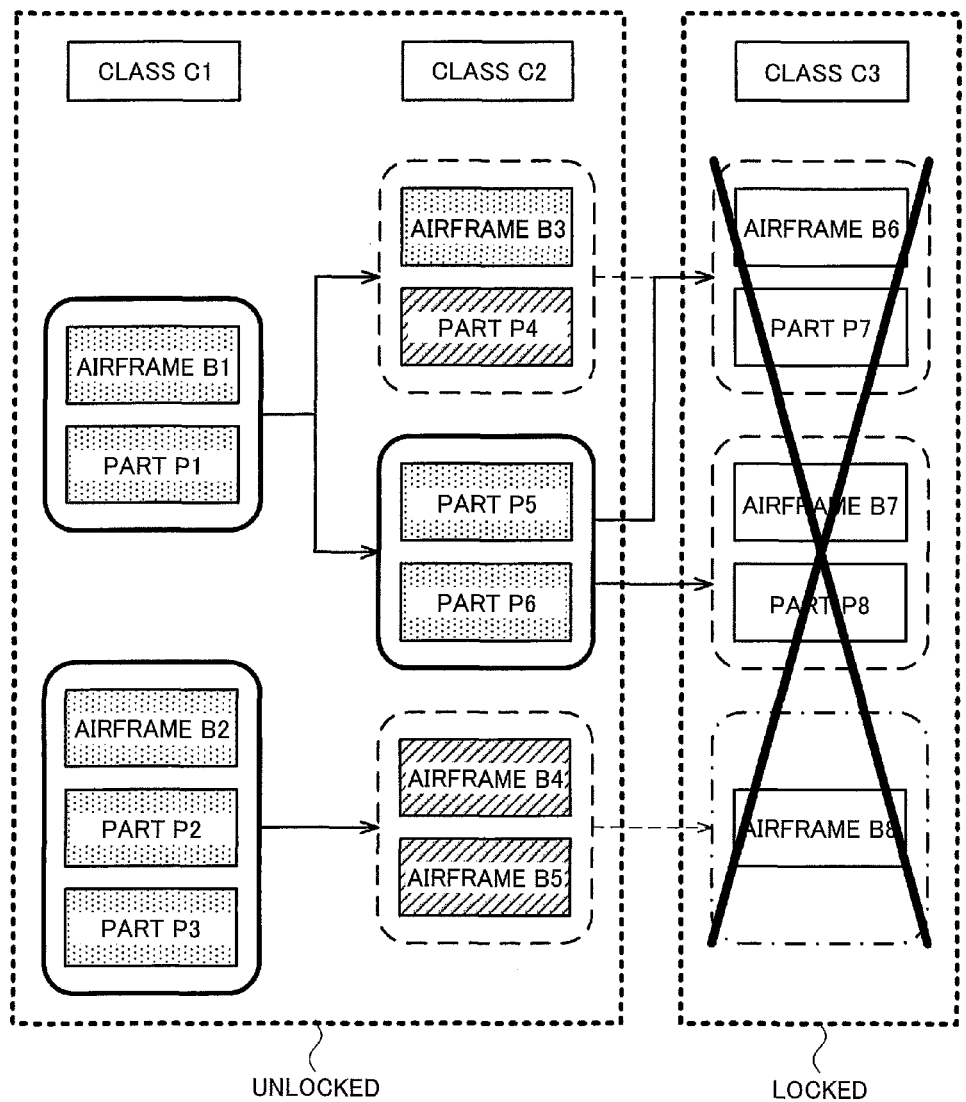
FIG. 17 is a view illustrating an item class.

The next class is unlocked each time the rank (level) of the player has reached a given rank. In FIG. 17, the class C2 is unlocked in addition to the class C1, for example. Therefore, the group formed by the airframe B3 and the part P4, the group formed by the part P5 and the part P6, and the group formed by the airframe B4 and the airframe B5 that belong to the class C2 can be set to be the lottery target. In this case, since the class C3 is not unlocked, the group formed by the airframe B6 and the part P7, the group formed by the airframe B7 and the part P8, and the airframe B8 that belong to the class C3, are necessarily excluded from the lottery target. Therefore, the airframes B4 and B5 and the part P4 are set to be the lottery target (i.e., the total number of lottery target airframes/parts is 3) (see FIG. 17). Specifically, one airframe/part is selected from the three lottery target airframes/parts.

FIG. 18 is a view illustrating an example of a research order that can be commissioned to the plant by the player. When the research order "Leave" in FIG. 18 is commissioned to the plant, research is selected by a lottery from all of the research (items) that can be developed on the tree. In this case, the player pays 0 tokens (in-game money).

The player can select an arbitrary research class, and request the plant to conduct research of only the selected research class. For example, the player requests the plant to conduct research of only the class C1, C2, or C3. This corresponds to changing the lottery range so that the lottery range is limited to a specific class (see FIG. 6). In this case, the player must pay TN1 tokens, and the duration for which the lottery range remains changed is M hours.

The player can also request the plant to conduct only level increase research (improvement research). This corresponds to changing the lottery range so that the lottery range is limited to the acquired item (level change) (see FIG. 7A). In this case, the player must pay TN2 (>TN1) tokens, and the duration for which the lottery range remains changed is M hours.

The player can also request the plant to conduct only new research. This corresponds to changing the lottery range so that the lottery range is limited to the item that is not acquired (additional acquisition) (see FIG. 7B). In this case, the player must pay TN3 (>TN2) tokens, and the duration for which the lottery range remains changed is M hours.

Figure 19:
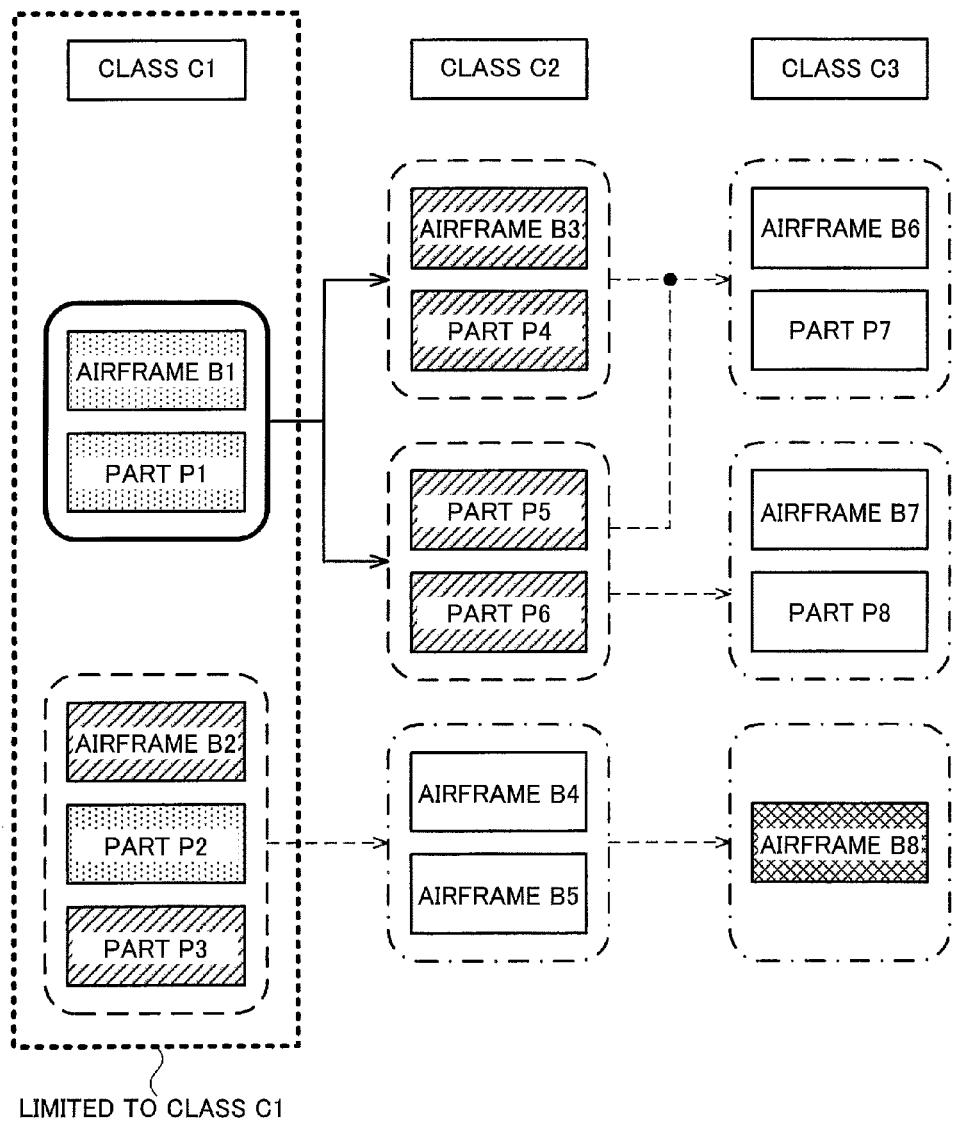
FIG. 19 is a view illustrating a lottery range change process limited to a specific class.

For example, when the player desires to acquire the airframe B8 (see FIG. 19), the airframes B2 and B3 and the parts P3, P4, P5, and P6 are set to be the lottery target (i.e., the total number of lottery targets is 6) when the research order "Leave" in FIG. 18 has been selected. Therefore, research progresses along a path that is irrelevant to the desired airframe B8 (i.e., a path that passes through the airframe B4 and the parts P4, P5, and P6) at a probability of 4/6, and progresses along a path that is relevant to the desired airframe B8 (i.e., a path that passes through the airframe B4 anhe airframe B5) at a probability of 2/6. Specifically, the probability that the research progresses along the path that is relevant to the desired airframe B8 is lower than the probability that the research progresses along the path that is irrelevant to the desired airframe B8.

In this case, the airframe B2 and the part P3 are set to be the lottery target if the player requests the plant to conduct research of only the class C1 in exchange for tokens (see FIG. 18). Specifically, the airframe B3 and the parts P4, P5, and P6 are excluded from the lottery target airframes/parts (i.e., the total number of lottery target airframes/parts is 2). Therefore, the research progresses along a path that is relevant to the desired airframe B8 (i.e., a path that passes through the airframe B2 and the part P3) at a probability of 2/2. Therefore, the probability that the research progresses along a path that is relevant to the desired airframe B8 can be increased as compared with the case where the research order "Leave" is selected (i.e., the research progresses corresponding to the player's need).

FIG. 20 illustrates an example of the lottery table information used when performing the lottery process. The lottery table information is stored in the lottery table information storage section 276 illustrated in FIG. 1. The lottery processing section 210 performs the lottery process (item lottery process) using the lottery table information.

In FIG. 20, the determination threshold value at level 1 is the threshold value used for a determination during the item acquisition process using the acquisition determination points (see FIG. 9A). In FIG. 20, the determination threshold value at level 1 is 150, and it is determined that the item research has completed when the acquisition determination points have reached 150. When the player has paid 5000 tokens, the item is produced (i.e., the item is set to the acquired state). The rarity (=10) corresponds to the winning rate of the item during the lottery process. The probability that the item is selected decreases as the rarity decreases. The rarity can be set to differ corresponding to the item.

In one embodiment of the invention, the player can increase the level of the airframe (i.e., improvement research). The player can increase the level of the airframe on condition that research and development at level 1 have completed. In FIG. 20, the determination threshold value that is used to determine whether or not the level can be increased to level 2 is 180. Therefore, when the player has paid 5200 tokens after the determination threshold value has been reached, the level of the airframe is increased from the level 1 to the level 2.

As illustrated in FIG. 20, the change value of the acquisition determination points may be determined by the lottery process. For example, the change value is set to 10 when "Normal" has been selected by the lottery process for determining the change value, and is set to 20 when "Rare" has been selected by the lottery process. The change value is set to 60 when "Special Rare" has been selected by the lottery process. Note that "Normal" is selected at a high probability (low rarity), and "Special Rare" is selected at a low probability.

3. Detailed Processing Example

Figure 21:
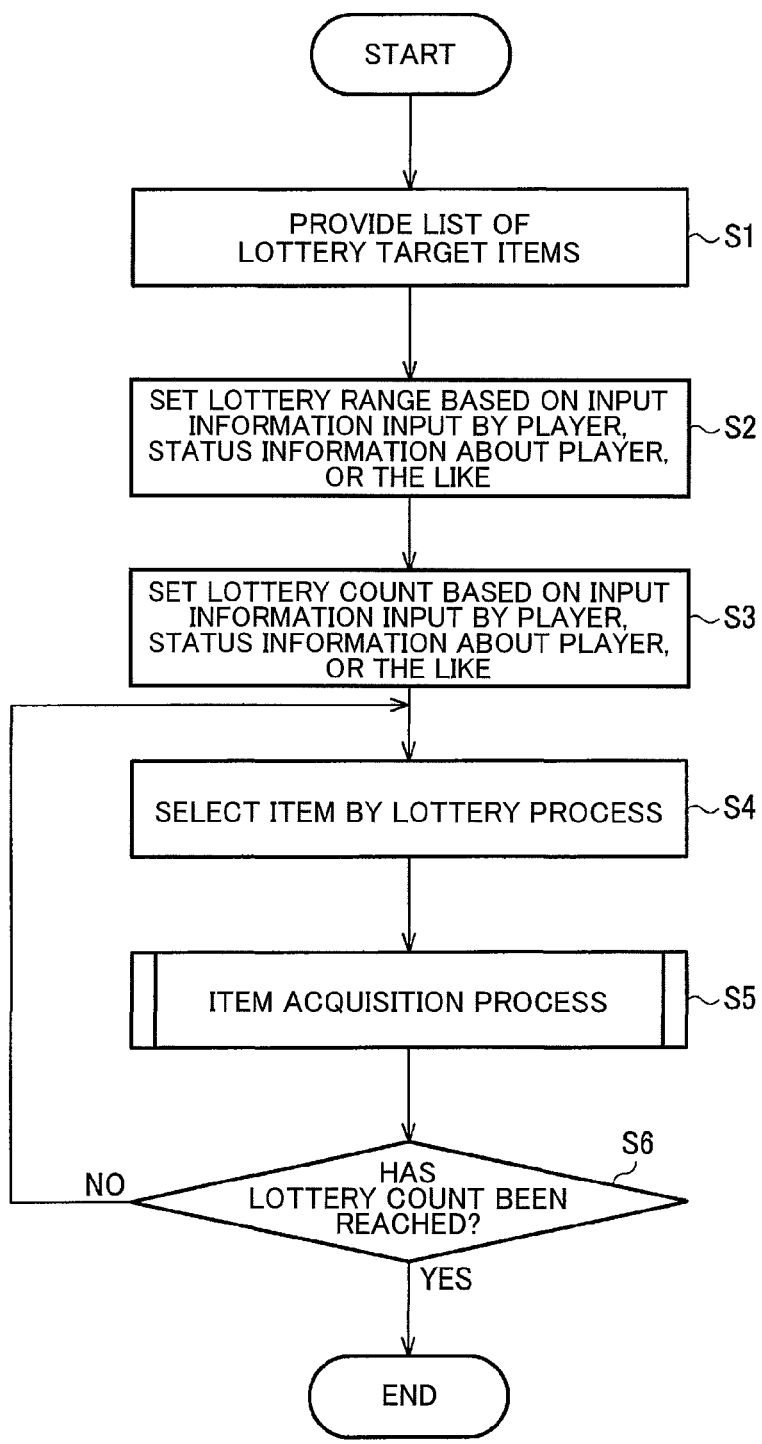
FIG. 21 is a flowchart illustrating a detailed processing example according to one embodiment of the invention.

A detailed processing example according to one embodiment of the invention is described below using flowcharts illustrated in FIGS. 21 and 22.

A list of the lottery target items is provided (step S1). Taking FIG. 5 as an example, a list of the items I1 to I5 is provided as a list of the lottery target items in the initial state. As described above with reference to FIG. 5, the lottery range is set based on the given information (e.g., the input information input by the player or the status information about the player) (step S2). Specifically, the lottery range is variably changed based on the given information (see FIGS. 6 to 7B).

The lottery count is set based on the given information (e.g., the input information input by the player or the status information about the player) (step S3). Specifically, the lottery count is variably set based on the given information (see FIG. 8A). For example, the lottery count is set to 3 when the player's team has defeated the opposing team in the team battle mode, and is set to 2 when the player's team has been defeated by the opposing team in the team battle mode. The player can increment the lottery count by one by paying cash or virtual money, for example.

An item is selected by the lottery process (step S4). The lottery process is performed on the lottery target items included within the lottery range set in the step S2. The item acquisition process is performed (FIG. 9A) (step S5). Whether or not the lottery count set in the step S3 has been reached is determined (step S6). The item selection process (step S4) and the item acquisition process (step S5) are repeated until the lottery count is reached.

Figure 22:
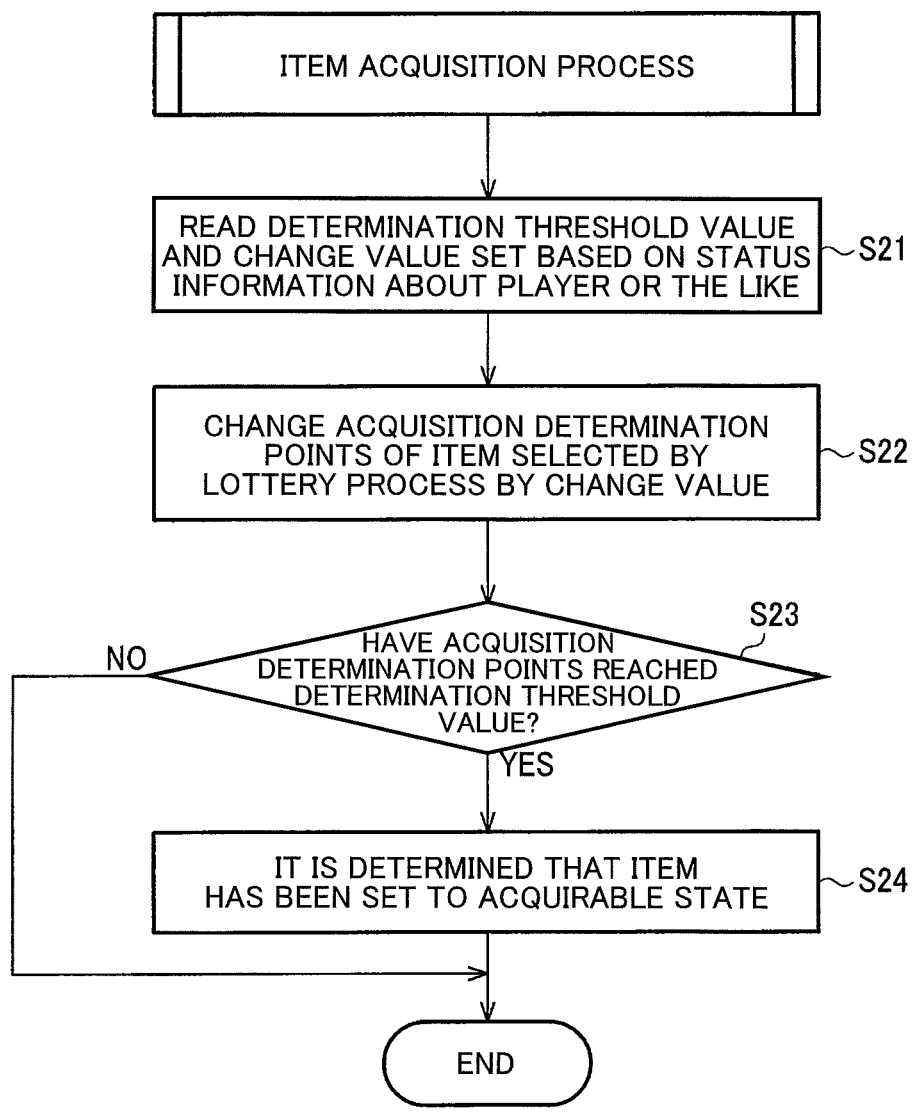
FIG. 22 is a flowchart illustrating a detailed processing example according to one embodiment of the invention.

FIG. 22 is a flowchart illustrating the details of the item acquisition process. The determination threshold value and the change value set based on the status information about the player or the like (see FIG. 9B) are read (step S21). The acquisition determination points of the item selected by the lottery process are changed by the change value (step S22).

Whether or not the acquisition determination points have reached the determination threshold value is determined (step S23). When it has been determined that the acquisition determination points have reached the determination threshold value, it is determined that the item has been set to the acquirable state (i.e., research has completed) (step S24).

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention. Any term (e.g., airframe/part) cited with a different term (e.g., item) having a broader meaning or the same meaning at least once in the specification and the drawings can be replaced by the different term in any place in the specification and the drawings. The lottery range setting process, the lottery process, the lottery range/lottery count/duration change process, the item acquisition process, and the like are not limited to those described in connection with the above embodiments. Methods equivalent to the above methods are intended to be included within the scope of the invention.

What is claimed is:

1. A game system comprising:
   a memory that stores information about a plurality of items used during a game, the plurality of items stored in a data structure in which the plurality of items are linked so as to have one or more parent-child type relationships; and
   a processor programmed to or an application-specific integrated circuit (ASIC) configured to:
   perform a game process;
   set a lottery range of a lottery process, the lottery range of the lottery process specifying a range of items among the stored plurality of items used during the game process that are subjected to the lottery process, wherein the lottery range is set so that a child item is included within the lottery range of the lottery process when a parent item has been set to an acquired state or an acquirable state;
   change the lottery range of the lottery process based on player-related information;
   select an item from items belonging to the set lottery range by performing the lottery process; and
   perform an item acquisition process that allows a player to acquire the selected item.

2. The game system as defined in claim 1, wherein the player-related information includes at least one piece of information among input information input by the player, status information about the player, game status information about the player, and charge information about the player.

3. The game system as defined in claim 1, wherein the processor is further programmed to or the ASIC is further configured to: change a lottery count of the lottery process based on at least one piece of information among input information input by the player, status information about the player, game status information about the player, and charge information about the player.

4. The game system as defined in claim 1, wherein the processor is further programmed to or the ASIC is further configured to: change at least one of a duration for which the lottery range of the lottery process remains changed, and a duration for which a lottery count of the lottery process remains changed, based on at least one piece of information among input information input by the player, status information about the player, game status information about the player, and charge information about the player.

5. The game system as defined in claim 1, wherein the processor is further programmed to or the ASIC is further configured to: change at least one of: the lottery range of the lottery process, a lottery count of the lottery process, a duration for which the lottery range of the lottery process remains changed, and a duration for which the lottery count of the lottery process remains changed, based on information about a team to which the player belongs, or player-related information about another player who belongs to the team.

6. The game system as defined in claim 1, wherein the processor is further programmed to or the ASIC is further configured to: change the lottery range of the lottery process so that the lottery range of the lottery process is set based on an item that has been set to the acquired state or the acquirable state.

7. The game system as defined in claim 1, wherein
   the plurality of items are classified to belong to one class among first to Nth classes, and
   the processor is further programmed to or the ASIC is further configured to: set items that belong to Lth to Kth ($1 \leq L \leq K \leq N$) classes among the first to Nth classes to be a lottery range setting target when a level of the player corresponds to the Kth class among the first to Nth classes.

8. The game system as defined in claim 7, wherein the processor is further programmed to or the ASIC is further configured to: change the lottery range of the lottery process so that the lottery range of the lottery process is set to items that belong to a class selected from the Lth to Kth classes based on the player-related information.

9. The game system as defined in claim 1, wherein the processor is further programmed to or the ASIC is further configured to: perform a level change process that changes a level of an item that has been set to the acquired state or the acquirable state and has been selected by the lottery process.

10. The game system as defined in claim 9, wherein the processor is further programmed to or the ASIC is further configured to: change the lottery range of the lottery process so that the lottery range of the lottery process is set based on the item that has been set to the acquired state or the acquirable state and has been subjected to the level change process.

11. The game system as defined in claim 1, wherein
    the processor is further programmed to or the ASIC is further configured to: select an item from the lottery range of the lottery process by performing the lottery process on a condition that the player has performed game play, or has finished the game play, and
    the item acquisition process includes:
       changing acquisition determination points of the item that has been selected from the lottery range, and
       allowing the player to acquire an item for which the acquisition determination points have reached a determination threshold value.

12. The game system as defined in claim 11, wherein the lottery process includes determining a change value of the acquisition determination points of the item that has been selected from the lottery range.

13. The game system as defined in claim 11, wherein the processor is further programmed to or the ASIC is further configured to: set at least one of a change value of the acquisition determination points and the determination threshold value based on at least one piece of information among input information input by the player, status information about the player, game status information about the player, and charge information about the player.

14. The game system as defined in claim 1, wherein the lottery process is a random sampling process that generates random number information, and randomly samples an item based on the generated random number information.

15. A server system comprising:
a processor programmed to or an application-specific integrated circuit (ASIC) configured to:
  perform a game process;
  set a lottery range of a lottery process, the lottery range of the lottery process specifying a range of items among a plurality of items used during the game process that are subjected to the lottery process, wherein the plurality of items are stored in a memory in a data structure in which the plurality of items are linked so as to have one or more parent-child type relationships, and the lottery range is set so that a child item is included within lottery range of the lottery process when a parent item has been set to an acquired state or an acquirable state;
  change the lottery range of the lottery process based on player-related information;
  select an item from the items that belong to the lottery range by performing the lottery process; and
  perform an item acquisition process that allows a player to acquire the selected item.

16. A computer-implemented method comprising:
performing, by a hardware processor or an application-specific integrated circuit (ASIC), a game process;
setting, by the hardware processor or the ASIC, a lottery range of a lottery process, the lottery range of the lottery process specifying a range of items among a plurality of items used during the game process that are subjected to the lottery process, wherein the plurality of items are stored in a memory in a data structure in which the plurality of items are linked so as to have one or more parent-child type relationships, and the lottery range is set so that a child item is included within the lottery range of the lottery process when a parent item has been set to an acquired state or an acquirable state;
changing, by the hardware processor or the ASIC, the lottery range of the lottery process based on player-related information;
selecting, by performing the lottery process by the processor or the ASIC, an item from the items that belong to the lottery range of the lottery process; and
performing, by the hardware processor or the ASIC, an item acquisition process that allows a player to acquire the selected item.

17. A non-transitory computer-readable information storage medium storing a program that, when executed by a computer, causes the computer to:
  perform a game process;
  set a lottery range of a lottery process, the lottery range of the lottery process specifying a range of items among a plurality of items used during the game process that are subjected to the lottery process, wherein the plurality of items are stored in a memory in a data structure in which the plurality of items are linked so as to have one or more parent-child type relationships, and the lottery range is set so that a child item is included within the lottery range of the lottery process when a parent item has been set to an acquired state or an acquirable state;
  change the lottery range of the lottery process based on player-related information;
  select, by performing the lottery process, an item from the items that belong to the lottery range of the lottery process; and
  perform an item acquisition process that allows a player to acquire the selected item.

* * * * *